(12) United States Patent
Kanno et al.

(10) Patent No.: US 9,722,847 B2
(45) Date of Patent: Aug. 1, 2017

(54) TRANSMITTER, RECEIVER, TRANSMISSION METHOD, AND RECEPTION METHOD

(71) Applicant: Panasonic Corporation, Osaka (JP)

(72) Inventors: Ippei Kanno, Kyoto (JP); Yoshinobu Matsumura, Osaka (JP); Teruaki Hasegawa, Osaka (JP); Shigeru Soga, Hyogo (JP); Kouya Watanabe, Osaka (JP); Hisateru Kobatake, Osaka (JP); Kenichi Mori, Tokyo (JP); Yoshio Urabe, Nara (JP)

(73) Assignee: PANASONIC CORPORATION, Osaka (JP)

( * ) Notice: Subject to any disclaimer, the term of this patent is extended or adjusted under 35 U.S.C. 154(b) by 57 days.

(21) Appl. No.: 14/439,643

(22) PCT Filed: Oct. 11, 2013

(86) PCT No.: PCT/JP2013/006114
§ 371 (c)(1),
(2) Date: Apr. 29, 2015

(87) PCT Pub. No.: WO2014/068873
PCT Pub. Date: May 8, 2014

(65) Prior Publication Data
US 2015/0288555 A1    Oct. 8, 2015

(30) Foreign Application Priority Data
Oct. 30, 2012 (JP) .................................. 2012-239514

(51) Int. Cl.
*H04L 27/26* (2006.01)
*H04W 84/12* (2009.01)

(52) U.S. Cl.
CPC ...... *H04L 27/2692* (2013.01); *H04L 27/2613* (2013.01); *H04L 27/2655* (2013.01); *H04W 84/12* (2013.01)

(58) Field of Classification Search
None
See application file for complete search history.

(56) References Cited

U.S. PATENT DOCUMENTS 7,668,252 B2    2/2010  Sandell et al.
8,064,414 B2    11/2011 Wallace et al.
(Continued)

FOREIGN PATENT DOCUMENTS

JP    2004-304363 A    10/2004
JP    2008-500765 A    1/2008
(Continued)

OTHER PUBLICATIONS

International Search Report dated Nov. 19, 2013, for corresponding International Application No. PCT/JP2013/006114, 6 pages.

*Primary Examiner* — Mohammad Adhami
(74) *Attorney, Agent, or Firm* — Seed Intellectual Property Law Group LLP

(57) ABSTRACT

A preamble generating unit generates first and second synchronization preambles having different numbers of subcarriers. A transmission signal generating unit generates an OFDM transmission signal through time-division multiplexing by using the generated first and second synchronization preambles. A transmission RF unit converts the generated OFDM transmission signal into a radio-frequency OFDM signal and transmits the radio-frequency OFDM signal. The preamble generating unit adds a predetermined dummy period between the first synchronization preamble and the second synchronization preamble.

3 Claims, 12 Drawing Sheets

(56) References Cited

U.S. PATENT DOCUMENTS

| | | |
|---|---|---|
| 8,712,400 B2 | 4/2014 | Wallace et al. |
| 8,792,877 B2 | 7/2014 | Wallace et al. |
| 2004/0001563 A1* | 1/2004 | Scarpa ................ H04L 27/2675 375/326 |
| 2005/0260968 A1* | 11/2005 | Ito ........................ H04B 7/0871 455/337 |
| 2006/0010361 A1 | 1/2006 | Lin |
| 2006/0209979 A1 | 9/2006 | Sandell et al. |
| 2006/0222114 A1 | 10/2006 | Lee et al. |
| 2007/0183370 A1 | 8/2007 | Wallace et al. |
| 2007/0280173 A1 | 12/2007 | Jo et al. |
| 2008/0089443 A1 | 4/2008 | Sanada et al. |
| 2010/0315138 A1* | 12/2010 | Namba ................... H03L 1/026 327/157 |
| 2012/0114019 A1 | 5/2012 | Wallace et al. |
| 2012/0127978 A1 | 5/2012 | Wallace et al. |
| 2013/0301551 A1* | 11/2013 | Ghosh ................. H04W 72/042 370/329 |

FOREIGN PATENT DOCUMENTS

| | | |
|---|---|---|
| JP | 2009-519689 A | 5/2009 |
| JP | 4357488 B2 | 11/2009 |
| JP | 4983365 B2 | 7/2012 |

\* cited by examiner

TRANSMITTER, RECEIVER, TRANSMISSION METHOD, AND RECEPTION METHOD

TECHNICAL FIELD

The present disclosure relates to a transmitter, a receiver, a transmission method, and a reception method that transmit or receive data through a wireless communication.

BACKGROUND ART

In recent years, as a recent activity of a wireless local area network (LAN) standard of the Institute of Electrical and Electronics Engineers, Inc. (IEEE) 802.11 (hereinafter, simply described as "802.11"), wireless LAN standards for increasing transmission capacity, such as 802.11b (a maximum of 11 Mbps (megabits per second)), 802.11a and 802.11g (a maximum of 54 Mbps), 802.11n (a maximum of 600 Mbps) and 802.11ac (a maximum of 6.9 Gbps (Gigabits per second)), have been added as a standard of a physical layer for indoor communication, for example.

Meanwhile, for example, a smart meter for implementing a smart grid has been examined in earnest, and there is a growing need for long-distance transmission at a low data transmission rate outdoors by use of the smart meter. The establishment of a new wireless LAN standard using a sub-GHz band, that is, a frequency bandwidth of less than 1 GHz has been studied, and the new standard includes assignment of available frequencies of a specific low-power radio device (for example, a smart meter). In the 802.11, Task Group (TG) ah which has studied a wireless LAN standard using a sub-GHz band was undertaken in 2010. As primary requirements for TGah, a data transmission rate is 100 kbps or more, and a maximum transmission distance is 1 km, for example.

In wireless LAN standards of task groups of the 802.11a and subsequent task groups using an orthogonal frequency division multiplexing (OFDM) signal, and also in TGah (802.11ah), a receiver establishes various synchronizations by using a preamble to be added to a header of a transmission packet, and performs burst communication. The preamble includes a short preamble used for automatic gain control (AGC) and automatic frequency control (AFC) for coarse tuning, and a long preamble for transmission channel estimation and fine-tuning AFC.

Patent Literature 1 suggests a method in which a receiving station detects a carrier frequency error in communication between a transmitting station and the receiving station by using the first transmission packet at the time of starting communication, and when the carrier frequency error between the transmitting and receiving stations is greater than a predetermined value, the carrier frequency error is corrected by using a detected value of the carrier frequency error at the time of receiving a subsequent transmission packet.

CITATION LIST

Patent Literature

Patent Literature 1: JP-T-2009-519689

SUMMARY OF INVENTION

Technical Problem

The inventors have studied a transmitter, a receiver, a transmission method, and a reception method that transmit or receive data through a wireless communication. However, in Patent Literature 1, when the OFDM signal is transmitted using a frequency band of, for example, a sub-GHz band, that is, a frequency band of less than 1 GHz, since the subcarrier interval is narrow, the receiver may fail to receive the OFDM signal by the carrier frequency error in some cases. Accordingly, when the receiver fails to receive a first transmission packet, there is a problem in that it is difficult for the transmitter and the receiver to communicate with each other.

In order to solve the aforementioned problem, an object of the present disclosure is to provide a transmitter, a receiver, a transmission method, and a reception method that improve deterioration in reception performance which arises from a carrier frequency error exceeding a subcarrier interval even when OFDM transmission signal is transmitted using a frequency band of, for example, a sub-GHz band.

Solution to Problem

The present disclosure provides a transmitter including: a preamble generating unit that generates first and second synchronization preambles having different numbers of subcarriers, and adds a predetermined dummy period between the first synchronization preamble and the second synchronization preamble; a transmission signal generating unit that generates an OFDM transmission signal by using the generated first and second synchronization preambles; and a transmission RF unit that converts the generated OFDM transmission signal into a radio-frequency OFDM signal and transmits the radio-frequency OFDM signal.

The present disclosure provides a receiver including: a reception RF unit that receives a radio-frequency OFDM transmission signal which includes first and second synchronization preambles having different numbers of subcarriers and a predetermined dummy period between the first synchronization preamble and the second synchronization preamble, and converts the received radio-frequency OFDM transmission signal into a baseband OFDM reception signal; a PLL unit that outputs the radio-frequency local signal; a frequency error estimating unit that detects a carrier frequency error in the baseband OFDM reception signal by using the first synchronization preamble; and a control unit that changes an oscillation frequency in the PLL unit in the predetermined dummy period when the detected carrier frequency error is greater than a predetermined value.

The present disclosure provides a transmission method including the steps of: generating first and second synchronization preambles having different numbers of subcarriers; adding a predetermined dummy period between the first synchronization preamble and the second synchronization preamble; generating an OFDM transmission signal using the generated first and second synchronization preambles; and converting the generated OFDM transmission signal into a radio-frequency OFDM signal and transmitting the radio-frequency OFDM signal.

The present disclosure provides a reception method including the steps of: receiving a radio-frequency OFDM transmission signal that includes first and second synchronization preambles having different numbers of subcarriers and a predetermined dummy period between the first synchronization preamble and the second synchronization preamble; outputting the radio-frequency local signal; converting the received radio-frequency OFDM transmission signal into a baseband OFDM reception signal by using the local signal; detecting a carrier frequency error in the baseband OFDM reception signal by using the first synchronization preamble; and changing an oscillation frequency of a PLL unit that outputs the local signal in the predetermined dummy period when the detected carrier frequency error is greater than a predetermined value.

Advantageous Effects of Invention

According to the present disclosure, it is possible to improve deterioration in reception performance which arises from a carrier frequency error exceeding a subcarrier interval even when an OFDM transmission signal is transmitted using a frequency band of, for example, a sub-GHz band.

DESCRIPTION OF EMBODIMENTS

Background for Respective Embodiments

Figure 1:
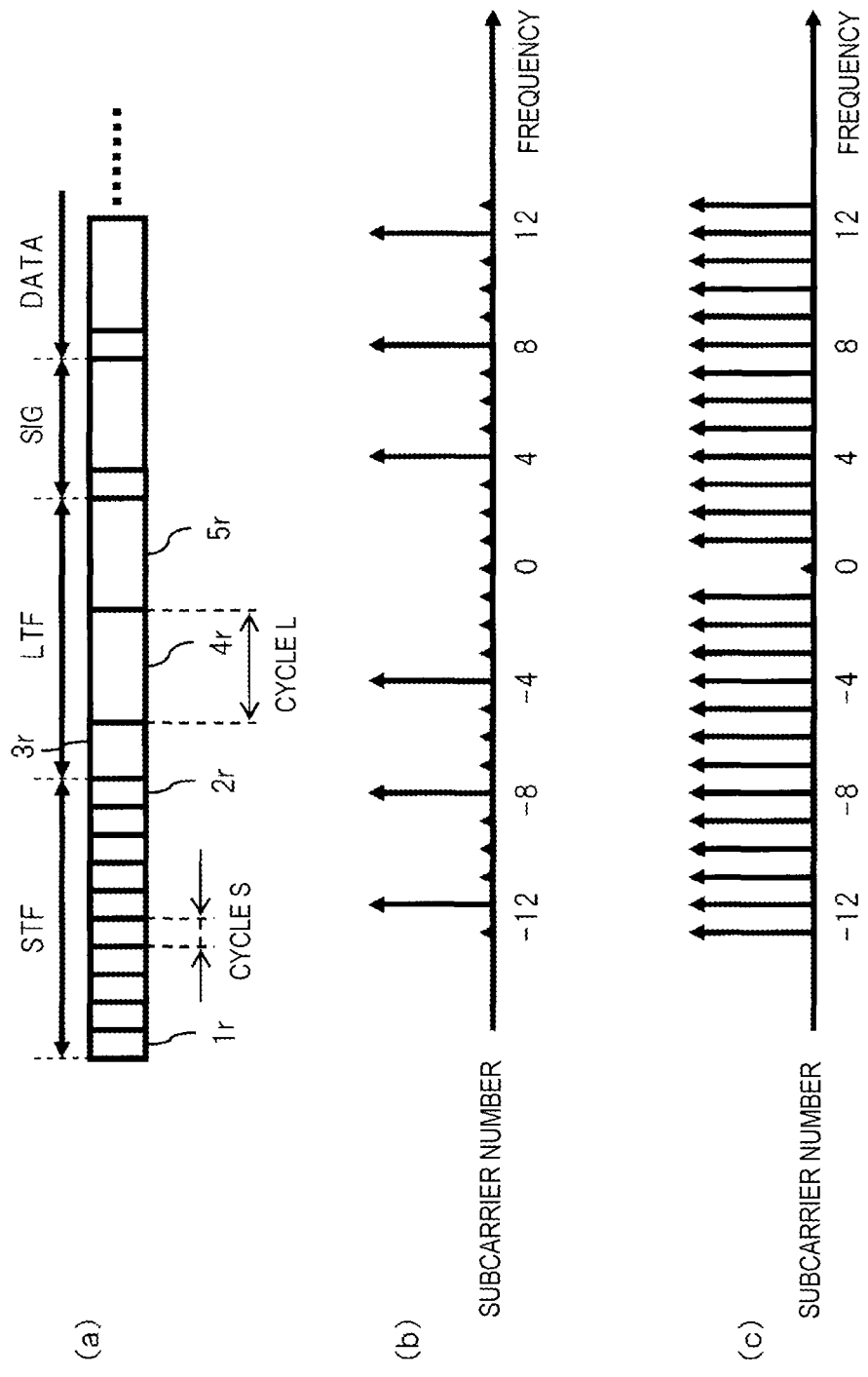
In FIG. 1, (a) is a schematic diagram showing the configuration of a transmission frame using an OFDM transmission signal in 802.11a, (b) is a diagram showing the allocation of subcarriers in a short preamble of a preamble section in a 1-MHz bandwidth mode of 802.11ah, and (c) is a diagram showing the allocation of subcarriers in a long preamble of the preamble section in the 1-MHz bandwidth mode of the 802.11ah.

Prior to the description of embodiments of a transmitter, a receiver, a transmission method, and a reception method according to the present disclosure, problems in a transmitter, a receiver, a transmission method, and a reception method according to the related art will be initially described with reference to FIG. 12. FIG. 12(a) is a diagram showing the spectra of OFDM transmission signals of 802.1a. FIG. 12(b) is a diagram showing the spectra of OFDM transmission signals of 802.11ah.

In FIG. 12(a) and FIG. 12(b), a horizontal axis indicates a frequency, and represents the spectra of the OFDM transmission signals of subcarriers corresponding to consecutive subcarrier numbers. In the 802.11a and 802.11ah, direct-conversion reception is assumed, and a subcarrier is not allocated at a center frequency (subcarrier number=0).

In the 802.11a, since a 64-point fast Fourier transform (FFT) is performed on a bandwidth of 20 MHz, a subcarrier interval is 312. 5 kHz. In the 802.11a, it is assumed that an allowable range of a carrier frequency error of the OFDM transmission signal is ±20 ppm.

The carrier frequency error is an error of a local oscillator used to perform up-conversion on a transmission frequency bandwidth from a baseband in the transmitter, and is caused by an error (for example, an error including at least one of temperature characteristics, a temporal variation, and an individual difference) of a crystal oscillator as a reference. The carrier frequency error is caused by an error of a local oscillator used to perform down-conversion from a reception frequency bandwidth to a baseband in a receiver. Accordingly, it is considered that a carrier frequency error in a reception signal is an error of ±40 ppm in total in the transmission and reception.

In the 802.11, since a transmission frequency is 5 GHz, a carrier frequency error of ±40 ppm is approximately ±200 kHz. In the direct-conversion reception, an analog circuit that uses baseband OFDM reception signal is configured through alternating current (AC) coupling in consideration of an influence of a DC offset in most cases. Notch characteristics represented by a broken line of FIG. 12(a) represent high pass filter (HPF) characteristics due to the AC coupling, and represent, for example, a case where the local oscillator of the transmitter is deviated by −20 ppm and the local oscillator of the receiver is deviated by +20 ppm.

In the 802.11a, since ±200 kHz which is a maximum value of the carrier frequency error is smaller than 312.5 kHz which is the subcarrier interval, there is a low possibility that subcarriers having adjacent subcarrier numbers may be damaged due to the notch characteristics shown in FIG. 12(a). That is, there is a low possibility that levels of subcarriers in positions of ±1 of FIG. 12(a) may be degraded or interference due to carrier leakage may occur. In 802.11n and 802.11ac that use a 5-GHz band, there is also a low possibility that subcarriers having adjacent subcarrier numbers will be damaged, due to the notch characteristics shown in FIG. 12(a).

Meanwhile, in the 802.11ah, since the 64-point FFT is performed on a bandwidth of 2 MHz, a carrier interval is 31.25 kHz. Similarly to the 802.11a, in the 802.11ah, an allowable range of a carrier frequency error of the OFDM transmission signal is ±20 ppm, and when a transmission frequency is, for example, 900 MHz, the carrier frequency error is approximately ±36 kHz.

Similarly to FIG. 12(a), notch characteristics shown by a broken line of FIG. 12(b) represent high-pass filter characteristics due to the AC coupling, and represent, for example, a case where the local oscillator of the transmitter is deviated by −20 ppm and the local oscillator of the receiver is deviated by +20 ppm.

However, in the 802.11ah, since ±36 kHz which is a maximum value of the carrier frequency error is greater than 31.25 kHz which is the subcarrier interval, subcarriers having adjacent subcarrier numbers may be damaged due to the notch characteristics shown in FIG. 12(b) in some cases. That is, there is a possibility that levels of subcarriers in positions of ±1 of FIG. 12(b) may be degraded or interference due to carrier leakage may occur.

In a 2-MHz bandwidth mode of 802.11ah, there are 48 data carriers, and in a 1-MHz bandwidth mode, there are 24 data carriers. Further, due to the damage of the subcarriers arising from the notch characteristics shown in FIG. 12(b), a packet error may occur in the receiver, that is, it may be difficult to correctly decode the OFDM transmission signal in the receiver in some cases.

Accordingly, in the following embodiments, even when the OFDM transmission signal is transmitted using a frequency band of, for example, a sub-GHz band as in the 802.11ah, examples of a transmitter, a receiver, a transmission method, and a reception method that improve deterioration in reception performance that arises from the carrier frequency error exceeding the subcarrier interval will be described.

DESCRIPTION OF EMBODIMENTS

Next, embodiments of a transmitter, a receiver, a transmission method, and a reception method according to the present disclosure will be described with reference to the drawings. FIG. 1(a) is a schematic diagram showing the configuration of a transmission frame of an OFDM transmission signal in the 802.11a. FIG. 1(b) is a diagram showing the allocation of subcarriers in a short preamble of a preamble section in a 1-MHz bandwidth mode of the 802.11ah. FIG. 1(c) is a diagram showing the allocation of subcarriers in a long preamble of the preamble section of the 1-MHz bandwidth mode of the 802.11ah. FIG. 2(a) is a schematic diagram showing an example of the configuration of a transmission frame of an OFDM transmission signal in a first embodiment.

The transmission frame of the 802.11a shown in FIG. 1(a) includes a preamble section that includes a short preamble (STF: Short Training Field) and a long preamble (LTF: Long Training Field), a header section (SIG: Signal), and a data section (DATA).

The short preamble (STF) includes periods (see symbols 4r to 2r) in which a known sequence symbol of a cycle S is repeatedly allocated ten times in total. In the short preamble (STF), since subcarriers are used in every four subcarriers intervals (312.5 kHz×4=1.25 MHz) (see FIG. 1(b)), the cycle S is 0.8 μsec.

The long preamble (LTF) includes periods (see symbols 4r and 5r) in which a known sequence symbol of a cycle L is repeatedly allocated twice. A guard interval 3r of the long preamble (LTF) is added between the last sequence symbol of the short preamble (STF) and the first sequence symbol of the long preamble (LTF). In the long preamble (LTF), since subcarriers are used in every one subcarrier interval (312.5 kHz×1=312.5 kHz), the cycle L is 3.2 μsec.

The header section (SIG) includes information (for example, information on a modulation method) for demodulating a payload of the data section (DATA). In the 802.11ah, the number of times the known sequence symbols are repeated in the short preamble (STF) and the long preamble (LTF) may be different from that in the 802.11a in some cases, but the transmission frame of the 802.11ah is the same as that in the 802.11a.

In the 802.11ah, since the transmission bandwidth of the transmission frame is a narrowband, the cycle S in the short preamble (STF) is 8 μsec, and the cycle L in the long preamble (LTF) is 32 μsec.

In the 802.11ah of the respective embodiments including the present embodiment, the 1-MHz bandwidth mode is described as an example, and the number of used subcarriers is 26 (see FIG. 1(c)). In the short preamble (STF) and the long preamble (LTF), subcarriers are not allocated at the DC (frequency zero) which is a center frequency.

Next, a transmission frame of the 802.11ah of the present embodiment shown in FIG. 2(a) includes a preamble section that includes a short preamble (STF) (see symbols 1a to 2a), a predetermined dummy period 6a, and a long preamble (LTF) (see symbols 3a to 5a), a header section (SIG), and a data section (DATA).

The short preamble (STF) includes periods (see symbols 1a to 2a) in which a known sequence symbol of a cycle S (8 μsec) is repeatedly allocated ten times in total.

The dummy period 6a may be added between the short preamble (STF) and the long preamble (LTF), and may be any signal (for example, a known sequence signal of the short preamble (STF) or the long preamble (LTF)), and may be, for example, no signal.

The long preamble (LTF) includes periods (see symbols 4a and 5a) in which a known sequence symbol of a cycle L (32 μsec) is repeatedly allocated twice. In the transmission frame of the 802.11ah shown in FIG. 2(a), a guard interval 3a of the long preamble (LTF) is added between the dummy period 6a and a period 4a in which the first sequence symbol of the long preamble (LTF) is allocated.

(Transmitter)

Next, the configuration and operation of a transmitter Tx of the present embodiment will be described with reference to FIG. 2(a) and FIG. 3. FIG. 3 is a block diagram showing an internal configuration of a part of the transmitter Tx of the first embodiment.

First, the configuration of the transmitter Tx of the present embodiment will be described. The transmitter Tx shown in FIG. 3 includes a transmission data input terminal 30, an error correction encoding unit 31, a preamble data generating unit 32, a transmission data composing unit 33, an OFDM signal generating unit 34, a frequency converting unit 35, a local oscillation signal generating unit 36, and a transmission antenna 37.

Next, the operations of the respective units of the transmitter Tx of the present embodiment will be described. Transmission data generated by a non-illustrated transmission data generating unit is input to the error correction encoding unit 31 through the transmission data input terminal 30. The error correction encoding unit 31 performs a predetermined error correction encoding process that includes convolutional encoding or interleaving by using the transmission data input through the transmission data input terminal 30, and outputs the processed data to the transmission data composing unit 33.

The preamble data generating unit 32 as a preamble generating unit generates preamble data added to a packet header of the transmission data. Specifically, the preamble data generating unit 32 generates data of the short preamble (STF) (See symbols 1a to 2a) in which a total of ten known sequence signals of a cycle S are allocated, data of the dummy period 6a, data of the guard interval 3a, and data of the long preamble (LTF) (see symbols 4a and 5a) in which a total of two known sequence signals of a cycle L are allocated, and outputs the generated data to the transmission data composing unit 33.

The transmission data composing unit 33 composes the transmission data obtained by adding an error correction symbol in the error correction encoding unit 31 and the preamble data generated in the preamble data generating unit 32, and generated transmission data in the format of the transmission frame shown in FIG. 2(a). The transmission data composing unit 33 outputs the generated transmission data to the OFDM signal generating unit 34.

The OFDM signal generating unit 34 generates an OFDM transmission signal by performing time-division multiplexing on the transmission data generated in the transmission data composing unit 33 according to a predetermined modulation method. The OFDM signal generating unit 34 outputs the generated OFDM transmission signal to the frequency converting unit 35. The transmission data composing unit 33 and the OFDM signal generating unit 34 constitute a transmission signal generating unit of the transmitter Tx.

The frequency converting unit 35 performs up-conversion by using the OFDM transmission signals generated in the OFDM signal generating unit 34 and a local oscillation signal generated in the local oscillation signal generating unit 36 to generate radio-frequency OFDM transmission signals. The radio-frequency OFDM transmission signals are transmitted through the transmission antenna 37. The frequency converting unit 35 and the transmission antenna 37 constitute a transmission radio frequency (RF) unit of the transmitter Tx.

The local oscillation signal generating unit 36 of the transmitter Tx generates the local oscillation signal (local signal) of a transmission frequency band (for example, 900 MHz band) of the 802.11ah, and outputs the generated local oscillation signal to the frequency converting unit 35.

(Receiver)

Figure 4:
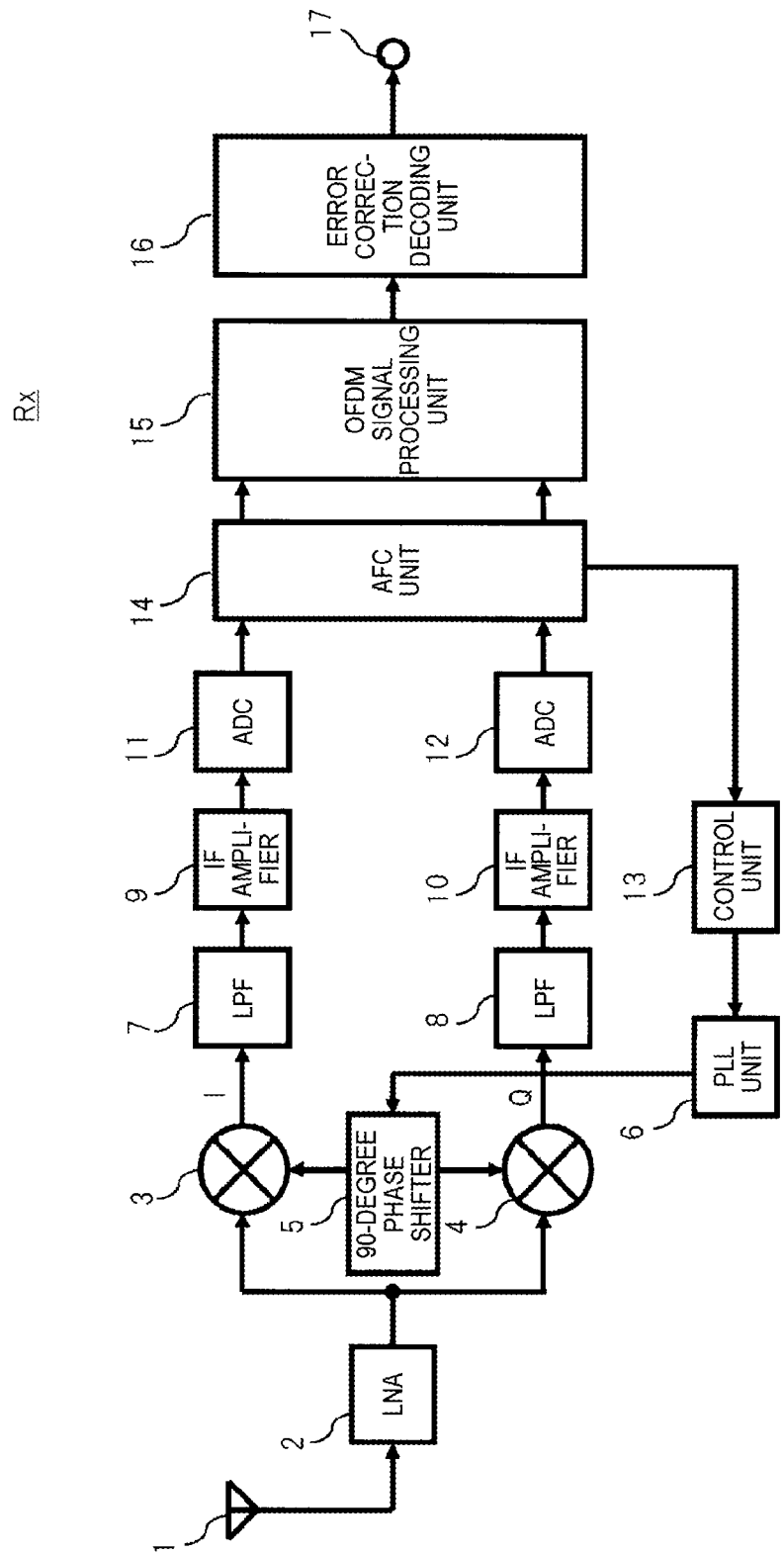
FIG. 4 is a block diagram showing an internal configuration example of a part of a receiver according to the first and second embodiments.
Figure 5:
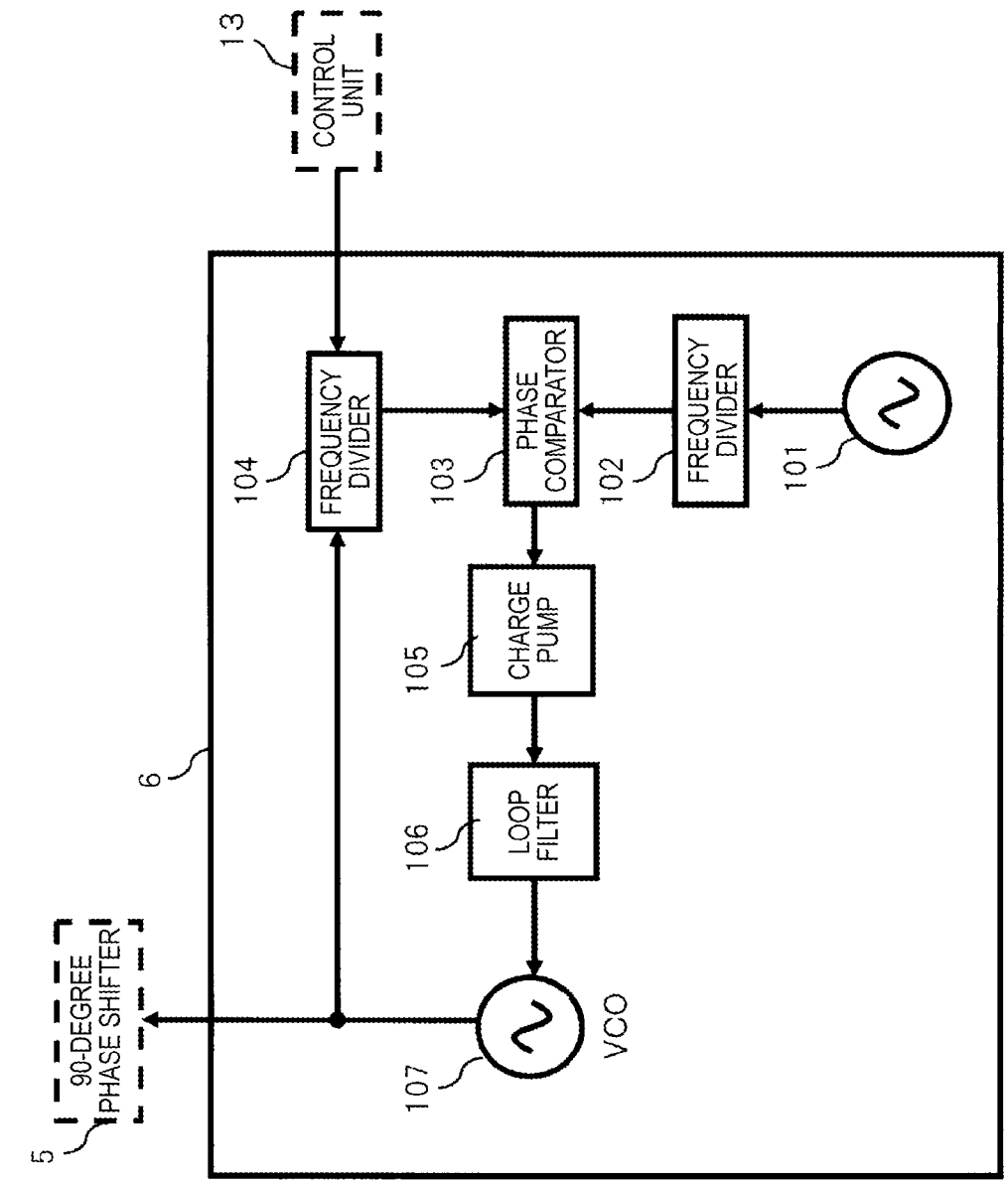
FIG. 5 is a block diagram showing an internal configuration example of a PLL unit within the receiver.
Figure 6:
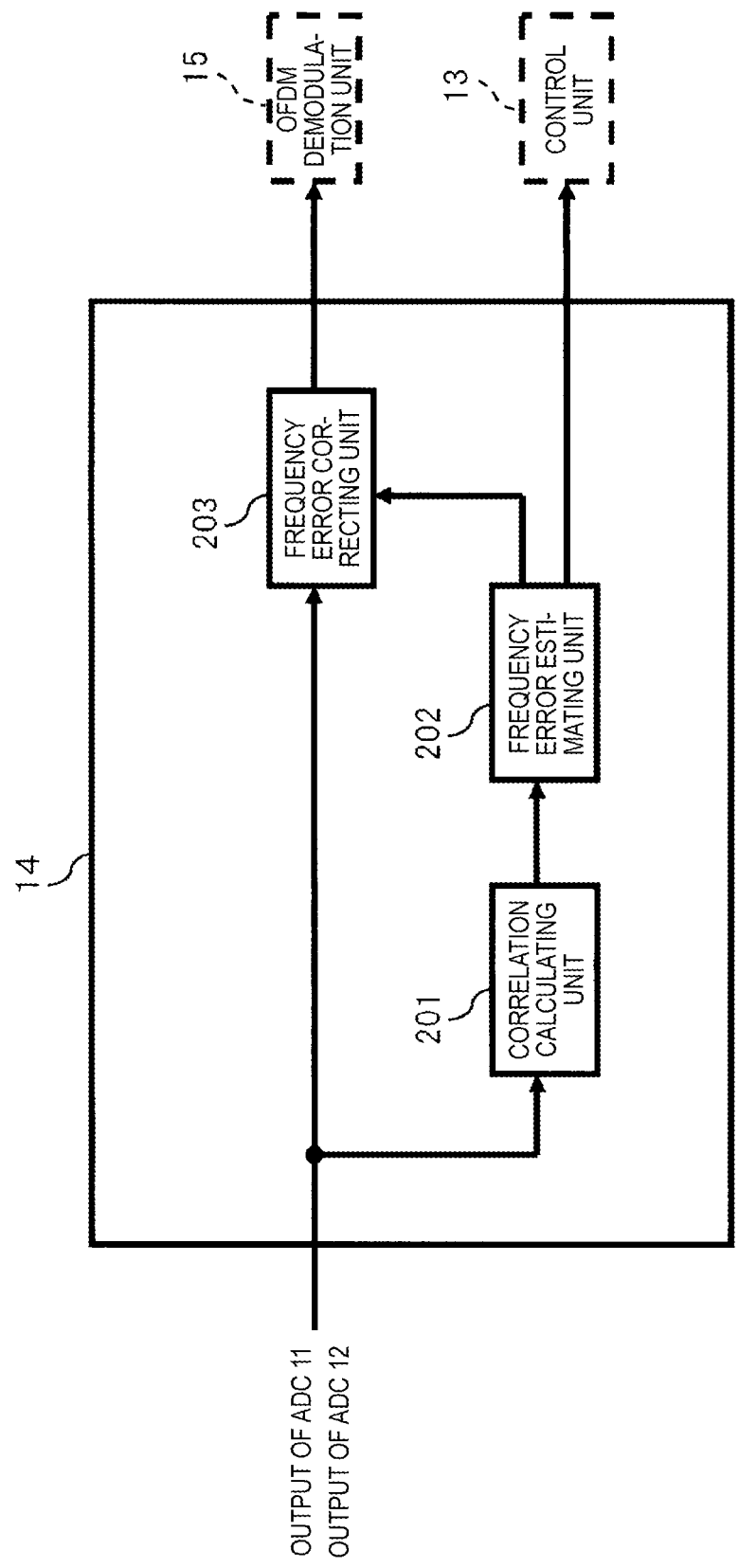
FIG. 6 is a block diagram showing an internal configuration example of an AFC unit within the receiver.

Next, the configuration and operation of a receiver Rx of the present embodiment will be described with reference to FIG. 2(a) and FIGS. 4 to 6. FIG. 4 is a block diagram showing an internal configuration example of a part of the receiver Rx of the first embodiment. FIG. 5 is a block diagram showing an internal configuration example of a PLL unit 6 within the receiver Rx. FIG. 6 is a block diagram showing an internal configuration example of an AFC unit 14 within the receiver Rx.

First, the configuration of the receiver Rx of the present embodiment will be described. The receiver Rx shown in FIG. 4 includes a reception antenna 1, a low noise amplifier (LNA) 2, mixers 3 and 4, a 90-degree phase shifter 5, a phase locked loop (PLL) unit 6, low-pass filters (LPFs) 7 and 8, intermediate frequency (IF) amplifiers 9 and 10, analog digital converters (ADCs) 11 and 12, a control unit 13, an AFC unit 14, an OFDM reception processing unit 15, an error correction decoding unit 16, and a reception data output terminal 17.

The PLL unit 6 includes a reference oscillator 101, a frequency divider 102, a phase comparator 103, a frequency divider 104, a charge pump 105, a loop filter 106, and a local oscillator (VCO: Voltage Controlled Oscillator) (see FIG. 5).

The AFC unit 14 includes a correlation calculating unit 201, a frequency error estimating unit 202, and a frequency error correcting unit 203 (see FIG. 6).

Next, the operations of the respective units of the receiver Rx of the present embodiment will be described. The radio-frequency OFDM transmission signals received by the reception antenna 1 are input to the LNA 2 as radio-frequency OFDM reception signals. The LNA 2 amplifies levels of the input radio-frequency OFDM reception signals, and outputs the amplified signals to RF input terminals (not shown) of the mixers 3 and 4.

The mixer 3 performs down-conversion by using the radio-frequency OFDM reception signals input to the RF input terminal and the local oscillation signal input to a LO input terminal (to be described below) to generate baseband OFDM reception signals having in-phase components (I components), and outputs the generated signals to the LPF 7.

The mixer 4 performs down-conversion by using the radio-frequency OFDM reception signals input to the RF input terminal and the local oscillation signal input to a LO input terminal (to be described below) to generate baseband OFDM reception signals having quadrature components (Q components), and outputs the generated signals to the LPF 8.

The 90-degree phase shifter 5 generates two local oscillation signals having a phase difference of 90 degrees by using the local oscillation signal output by a pull-in operation of the PLL unit 6, and outputs the generated signals to the LO (local) input terminals (not shown) of the mixers 3 and 4. The pull-in operation of the PLL unit 6 refers to an operation in which the PLL unit 6 outputs a local oscillation signal of a reception frequency band to the 90-degree phase shifter 5 by using a predetermined frequency division ratio in the frequency divider 104.

A frequency in the local oscillation signal from the PLL unit 6 is set so as to match the center frequency of the radio-frequency OFDM reception signals received by the reception antenna 1. For this reason, frequency conversion is performed on the center frequency of the radio-frequency OFDM reception signals to the DC, and the OFDM reception signals having the in-phase components (I components) generated in the mixer 3 and the OFDM reception signals having the quadrature components (Q components) generated in the mixer 4 become baseband signals, respectively.

Due to the pull-in operation or a re-pull-in operation (to be described below), the PLL unit 6 of the receiver Rx generates the local oscillation signal (local signal) of the reception frequency band (for example, 900 MHz band) of the 802.11ah, and outputs the generated signal to the 90-degree phase shifter 5.

More specifically, the reference oscillator 101 outputs a reference signal of a predetermined output frequency fXtal to the frequency divider 102.

The frequency divider 102 outputs a first frequency-division signal obtained by dividing the frequency of the reference signal generated in the reference oscillator 101 by 1/R to the phase comparator 103. R is an integer of 1 or more, and is a frequency division ratio between an input frequency and an output frequency in the frequency divider 102.

The phase comparator 103 compares a phase component of the first frequency-division signal generated in the frequency divider 102 with a phase component of a second frequency-division signal generated in the frequency divider 104. As a comparison result, the phase comparator 103 detects a phase error between the frequency dividers 102 and 104 to output the detected error to the charge pump 105.

The frequency divider 104 outputs the second frequency-division signal obtained by dividing an output frequency of the local oscillation signal generated in the local oscillator 107 at a fraction ratio represented by Expression (1) to the phase comparator 103. M is an integer part of the frequency division ratio of the frequency divider 104. K is an integer indicating a fractional part of the frequency division ratio of the frequency divider 104, and $0 \leq K < 2^n$.

[Expression 1]

$$\left(M + \frac{K}{2^n}\right) \quad (1)$$

The charge pump 105 converts the phase error detected in the phase comparator 103 into a current to output the converted current to the loop filter 106.

The loop filter 106 generates a control voltage of the local oscillator 107 in response to the current converted in the charge pump 105. The loop filter 106 outputs (applies) the generated control voltage to the local oscillator 107.

The local oscillator 107 is a voltage-controlled oscillator (VCO) that oscillates in response to the control voltage generated in the loop filter 106 to generate the local oscillation signal. A frequency (oscillation frequency) fLO of the local oscillation signal generated in the local oscillator 107 is represented by Expression (2), and is output to the 90-degree phase shifter 5 and the frequency divider 104. When the 90-degree phase shifter 5 shifts a phase by 90 degrees by dividing a frequency by ¼, the oscillation frequency of the local oscillator 107 may be set to four times greater than the center frequency of the OFDM reception signal. The fXtal is an oscillation frequency of the reference oscillator 101.

[Expression 2]

$$fLO = \left(M + \frac{K}{2^n}\right)\frac{fXtal}{R} \quad (2)$$

The LPF 7 removes signals having frequencies equal to or greater than a predetermined limited frequency bandwidth among the baseband OFDM reception signal having the in-phase components (I components) generated in the mixer 3, and outputs the signal to the IF amplifier 9.

The LPF 8 removes signals having frequencies equal to or greater than a predetermined limited frequency bandwidth among the baseband OFDM reception signal having the quadrature components (Q components) generated in the mixer 4, and outputs the signal to the IF amplifier 10.

The IF amplifier 9 amplifies levels of the OFDM reception signal having the in-phase components (I components) which have passed through the LPF 7 to a predetermined level, and outputs the amplified signal to the ADC 11.

The IF amplifier 10 amplifies levels of the OFDM reception signal having the quadrature components (Q components) which have passed through the LPF 8 to a predetermined level, and outputs the amplified signal to the ADC 12.

The ADC 11 converts the analog OFDM reception signal having the in-phase components (I components) amplified in the IF amplifier 9 into digital OFDM reception signal having the in-phase components (I components), and outputs the converted signal to the AFC unit 14.

The ADC 12 converts the analog OFDM reception signal having the quadrature components (Q components) amplified in the IF amplifier 10 into a digital OFDM reception signal having the quadrature components (Q components), and outputs the converted signal to the AFC unit 14.

The control unit 13 determines whether or not an absolute value (|Δfs|) of a carrier frequency error Δfs calculated in the AFC unit 14 is greater than a predetermined value Δfsub. When the absolute value (|Δfs|) of the carrier frequency error Δfs is, for example, a value less than one half of the subcarrier interval in the long preamble (LTF) of the 802.11ah, the receiver Rx can correct the carrier frequency error in reception periods of the long preamble (LTF). Accordingly, the predetermined value Δfsub is, for example, a value less than one half of the subcarrier interval in the long preamble (LTF) of the 802.11ah.

When it is determined that the absolute value (|Δfs|) of the carrier frequency error Δfs is greater than the predetermined value Δfsub, the control unit 13 changes the value K of the fractional part of the frequency division ratio of the frequency divider 104 of the PLL unit 6 to a different value K' (see Expression (3)) in the dummy period 6a. The control unit 13 causes the PLL unit 6 to perform the re-pull-in operation by using the changed value K' of the fractional part of the frequency division ratio in the dummy period 6a. That is, the PLL unit 6 performs the re-pull-in operation by using the value K' of the fractional part of the frequency division ratio of the frequency divider 104 changed by the control unit 13 in the dummy period 6a.

The re-pull-in operation is an operation in which the PLL unit 6 outputs the local oscillation signal by changing the frequency division ratio of the frequency divider 104 to perform the re-pull-in operation by using the value K' of the fractional part of the frequency division ratio calculated by the control unit 13. n is an integer of 1 or more, and the fXtal is an oscillation frequency of the reference oscillator 101.

[Expression 3]

$$K' = K - \frac{R\Delta fs}{fXtal} \times 2^n \quad (3)$$

For example, in second-half reception periods of the short preamble (STF) or the reception periods of the long preamble (LTF), the AFC unit 14 calculates detected values of the phase errors of the OFDM reception signals converted into the digital signals in the ADCs 11 and 12, and calculates a carrier frequency error based on the detected values of the calculated phase errors or an average value of the detected values of the phase errors.

By using the reception signal of the long preamble (LTF), the AFC unit 14 generates a correction signal of the calculated carrier frequency error, and corrects the carrier frequency error of the OFDM reception signals converted into the digital signals in the ADCs 11 and 12.

More specifically, by using, for example, the second-half reception periods of the short preamble (STF), the correlation calculating unit 201 calculates the detected values of the phase errors in the OFDM reception signals converted into the digital signals in the ADCs 11 and 12, and averages the detected values of the phase errors during the second-half reception periods of the short preamble (STF).

For example, in the second-half reception periods of the short preamble (STF), when the carrier frequency error calculated by the frequency error estimating unit 202 based on the detected value of the phase error calculated by the correlation calculating unit 201 is less than the predetermined value Δfsub, the frequency error correcting unit 203 does not correct the frequency error included in the OFDM reception signal converted into the digital signal in the ADCs 11 and 12, and outputs the OFDM reception signal converted into the digital signal in the ADCs 11 and 12 to the OFDM reception processing unit 15.

By using the reception periods of the long preamble (LTF), the correlation calculating unit 201 calculates the detected values of the phase errors included in the OFDM reception signals converted into the digital signals in the ADCs 11 and 12, and averages the detected values of the phase errors in the reception periods of the long preamble (LTF). Thus, the correlation calculating unit 201 can suppress noise included in the OFDM reception signals, and improve reception signal-to-noise (SNR) in comparison to the reception periods of the short preamble (STF).

In the reception periods of the long preamble (LTF), the frequency error correcting unit 203 generates the correction signal of the carrier frequency error in the OFDM reception signals converted into the digital signals in the ADCs 11 and 12 to correct carrier frequency error components of the OFDM reception signal, and outputs the OFDM reception signal whose carrier frequency error component is corrected to the OFDM reception processing unit 15.

In, for example, the second-half reception periods of the short preamble (STF) or the reception periods of the long preamble (LTF), the frequency error estimating unit 202 calculates the carrier frequency error by using the detected values of the phase errors calculated by the correlation calculating unit 201.

The OFDM reception processing unit 15 demodulates the OFDM reception signals by using the OFDM reception signals whose carrier frequency errors are corrected in the AFC unit 14 and data included in the header section (SIG), and extracts reception data on which the error correction encoding process is performed by the transmitter TX. The OFDM reception processing unit 15 outputs the reception data on which the error correction encoding process is performed to the error correction decoding unit 16.

The error correction decoding unit 16 outputs decoded reception data obtained by performing a predetermined error correction decoding process on the demodulated reception data in the OFDM reception processing unit 15 to a reception-data output terminal 17. The decoded reception data output to the reception-data output terminal 17 is used in a non-illustrated subsequent process.

In the respective embodiment including the present embodiment, due to the carrier frequency errors of the OFDM transmission signals which are caused by the local oscillator (not shown) of the local oscillation signal generating unit 36 of the transmitter Tx and the carrier frequency error of the local oscillation signal which is caused by the local oscillator 107 of the PLL unit 6 of the receiver Rx, when the frequency error is the maximum (worst error value), there is a possibility that the center frequencies (DC) of the baseband OFDM reception signals that are respectively generated in the mixers 3 and 4 may become the center of the notch characteristics shown by the broken line of FIG. 12(b).

In FIG. 4, when the circuit is configured through the AC coupling in the baseband region from the mixers 3 and 4 to the input terminals of the ADCs 11 and 12, the high-pass filter characteristics due to the AC coupling are exhibited as the notch characteristics shown in FIG. 12(b). For this reason, subcarriers near the notch characteristics may be damaged due to the notch characteristics shown in FIG. 12(b) in some cases, and specifically, there is a possibility that levels of subcarriers in positions of subcarrier numbers ±1 of FIG. 12(b) may be degraded or interference due to carrier leakage may occur.

Figure 7:
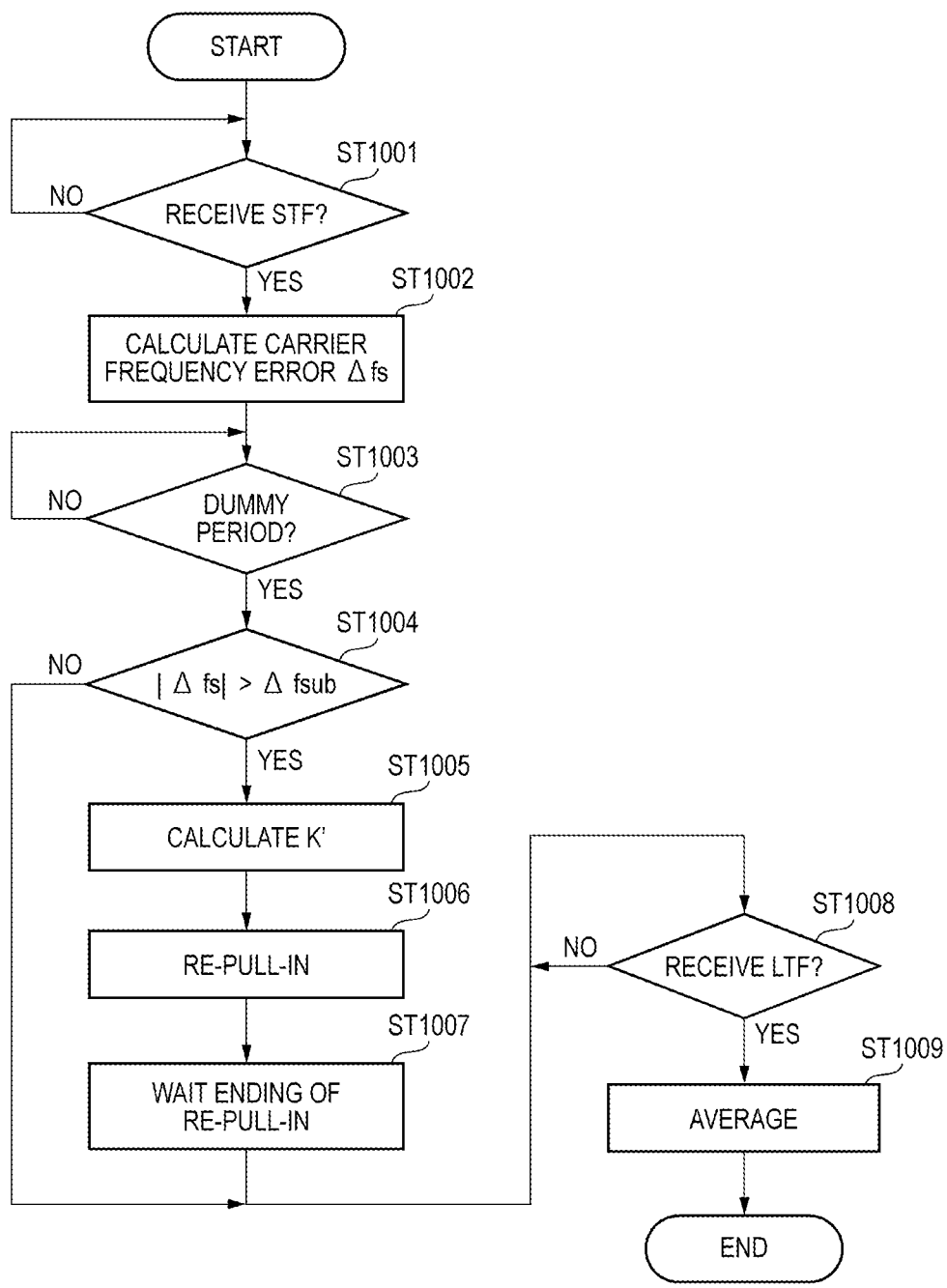
FIG. 7 is a flowchart for describing the respective operations of an AFC unit, a control unit and a PLL unit within the receiver according to the first embodiment in the preamble section.

Next, the respective operations of the AFC unit 14, the control unit 13 and the PLL unit 6 within the receiver Rx of the present embodiment in the preamble section will be described with reference to FIG. 7. FIG. 7 is a flowchart for describing the respective operations of the AFC unit 14, the control unit 13 and the PLL unit 6 within the receiver Rx of the first embodiment in the preamble section. The preamble section is a period that includes the short preamble (STF) (see symbols 1a to 2a), the dummy period 6a, and the long preamble (LTF) (see symbols 3a to 5a) including the guard interval 3a shown in FIG. 2(a).

In FIG. 7, when the known sequence signal in the short preamble (STF) is detected (ST1001, YES), AGC of the OFDM reception signals is performed in, for example, first-half reception periods of the short preamble (STF) shown in FIG. 2(a). In the flowcharts shown in FIGS. 7 and 8, the performing of the AGC of the OFDM reception signals is not illustrated and described, and the AGC will be described in detail in third and fourth embodiments (see FIGS. 9 to 11).

In the second-half reception periods of the short preamble (STF), the correlation calculating unit 201 calculates a correlation operation value between the OFDM reception signals having no delay and the OFDM reception signals having a delay corresponding to one cycle of the cycle S by performing complex multiplication on the OFDM reception signals converted into the digital signals in the ADCs 11 and 12 and the OFDM reception signals obtained by use of complex conjugation in which one cycle of the cycle S(=time ΔTs) of the OFDM reception signal is delayed. The correlation calculating unit 201 calculates a detected value of a phase error Δθs occurring in a period of the time ΔTs based on a phase component of the correlation operation value.

The correlation calculating unit 201 averages detected values of phase errors Δθs by the same complex multiplication for each cycle S during the second-half reception periods of the short preamble (STF). Thus, the correlation calculating unit 201 can suppress noise in the second-half reception periods of the short preamble (STF), and improve reception SNR. The correlation calculating unit 201 outputs an average value Δθsave of the detected values of the phase errors Δθs calculated during the second-half reception periods of the short preamble (STF) to the frequency error estimating unit 202.

The frequency error estimating unit 202 calculates the carrier frequency error Ms according to Expression (4) by using the time ΔTs and the average value Δθsave of the detected values of the phase errors Δθs calculated in the correlation calculating unit 201, and outputs the calculated carrier frequency error to the control unit 13 (ST1002).

[Expression 4]

$$\Delta fs = \frac{\Delta \theta \text{save}}{\Delta Ts} \quad (4)$$

After the second-half reception periods of the short preamble (STF) shown in FIG. 2(a) ends, in the dummy period 6a subsequent to the short preamble (STF) (ST1003, YES), the control unit 13 determines whether or not the absolute value (|Δfs|) of the carrier frequency error Δfs calculated in the frequency error estimating unit 202 is greater than the predetermined value Δfsub (ST1004).

When it is determined that the absolute value (|Δfs|) of the carrier frequency error Δfs is less than the predetermined value Δfsub (ST1004, NO), the control unit 13 outputs the determination result to the frequency error estimating unit 202. Based on the determination result determined in the control unit 13, the frequency error estimating unit 202 outputs, as control signals to be output to the OFDM reception processing unit 15, the OFDM reception signals converted into the digital signals in the ADCs 11 and 12 to the frequency error correcting unit 203 in the dummy period 6a.

That is, when the absolute value (|Δfs|) of the carrier frequency error Δfs is less than the predetermined value Δfsub (ST1004, NO), the frequency error correcting unit 203 does not correct the carrier frequency error in the OFDM reception signals converted into the digital signals in the ADCs 11 and 12, and outputs the OFDM reception signal to the OFDM reception processing unit 15.

Meanwhile, when it is determined that the absolute value (|Δfs|) of the carrier frequency error Δfs is greater than the predetermined value Δfsub (ST1004, YES), the control unit 13 calculates the new value K' of the fractional part of the frequency division ratio according to Expression (3) by using the value K of the fractional part of the frequency division ratio of the frequency divider 104 of the PLL unit 6 (ST1005).

The PLL unit 6 performs the re-pull-in operation by using the new value K' of the fractional part of the frequency division ratio calculated in step ST1005 in the frequency divider 104 (ST1006). Since it takes a certain time to end the re-pull-in operation, the control unit 13 and the AFC unit 14 wait until the re-pull-in operation ends (ST1007).

Figure 2:
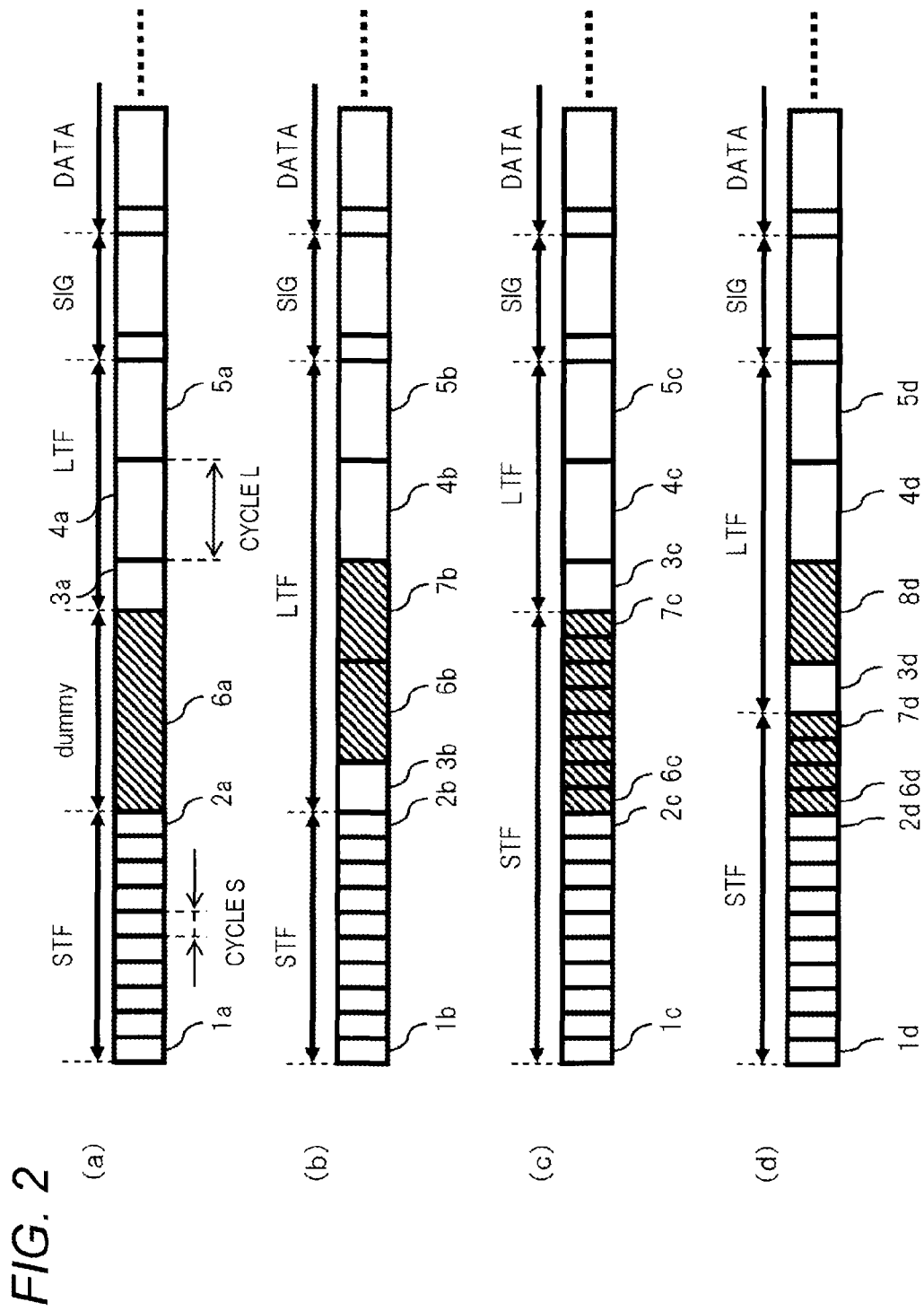
FIG. 2 is a schematic diagram showing an example of the configuration of a transmission frame using an OFDM transmission signal, of which (a) is a first embodiment, (b) is a second embodiment, (c) is a third embodiment, and (d) is a fourth embodiment.
Figure 3:
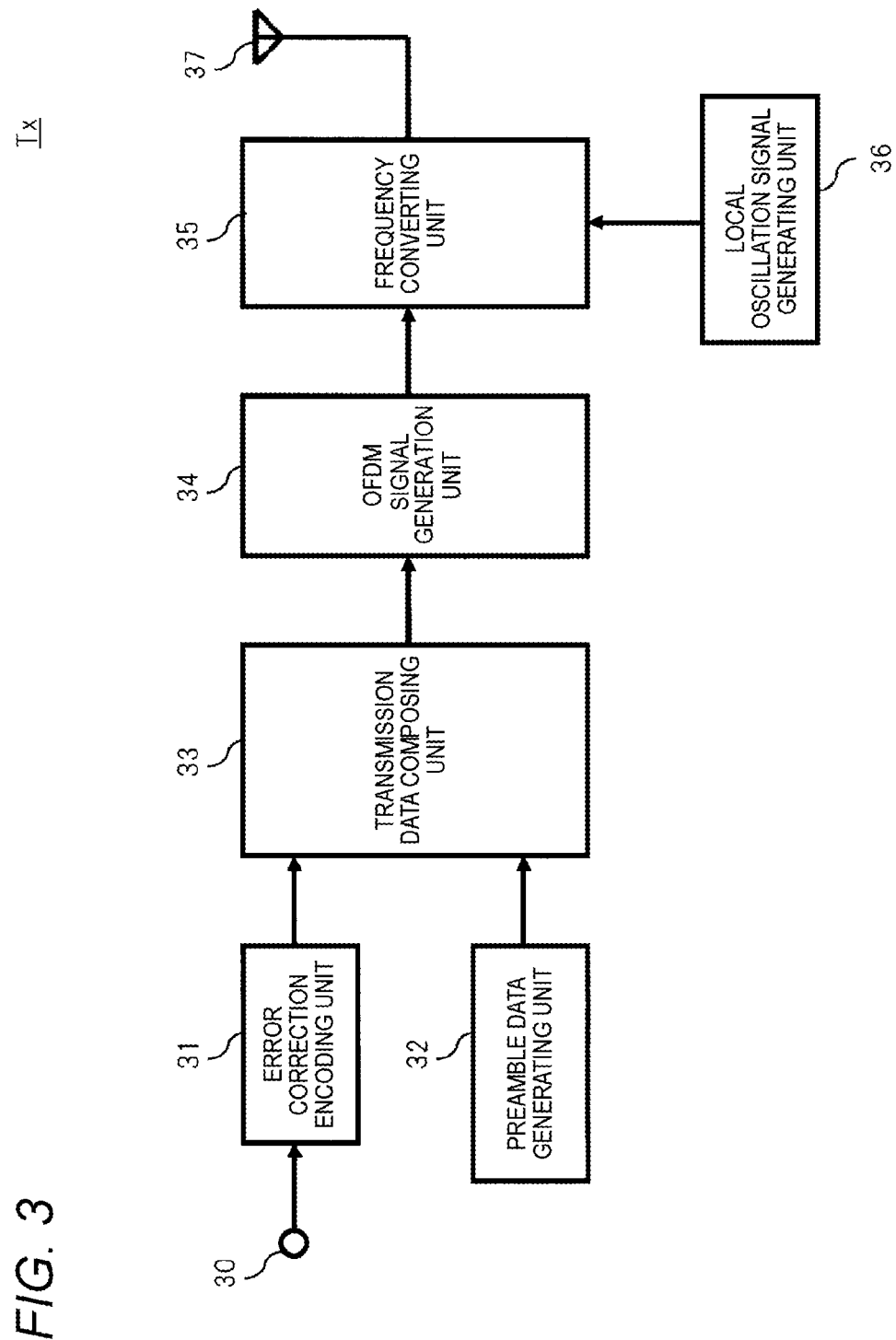
FIG. 3 is a block diagram showing an internal configuration example of a part of a transmitter according to the first embodiment.

A time taken to converge the re-pull-in operation is an order of approximately several tens of μsec, and the dummy period 6a is previously determined in consideration of the time taken until the re-pull-in operation of the PLL unit 6 ends in the dummy period 6a shown in FIG. 2(*a*).

Figure 12:
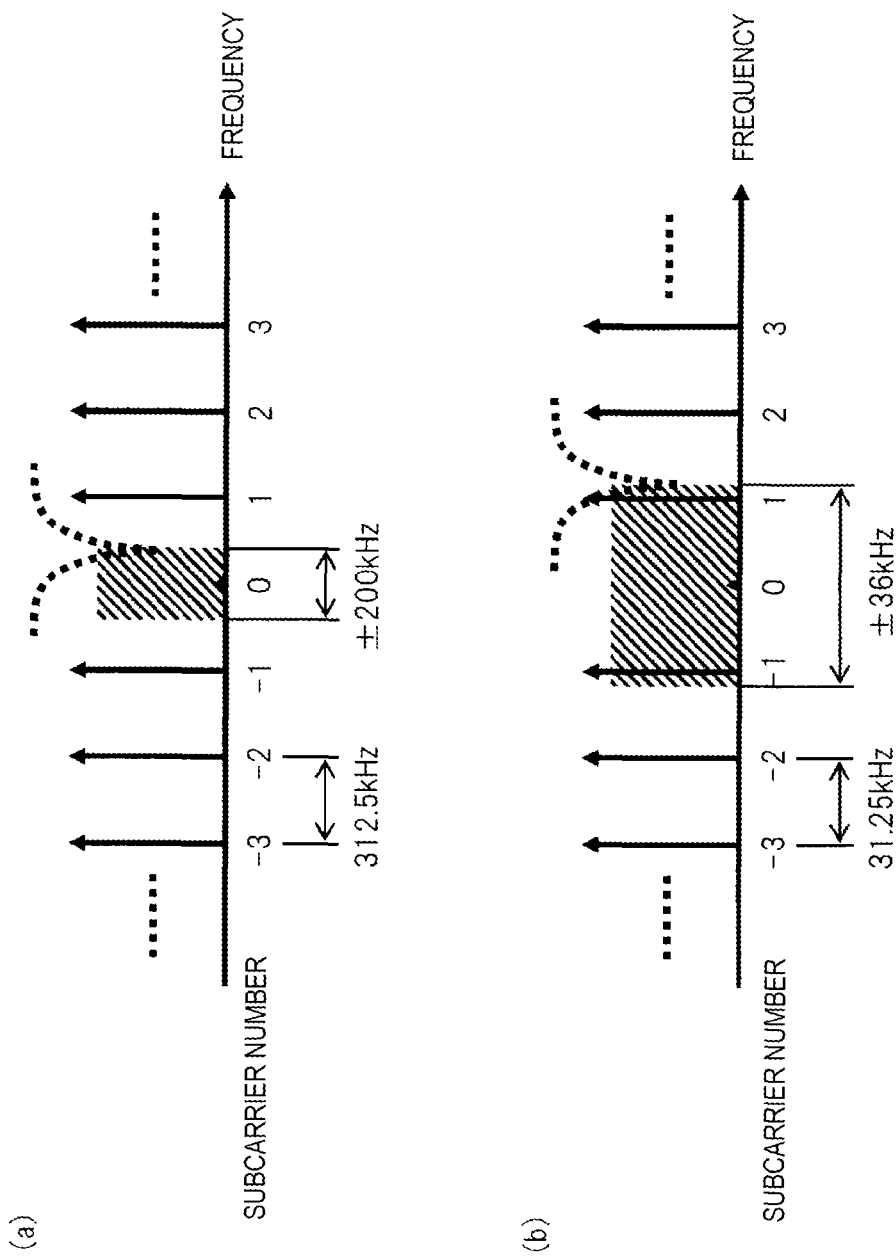
In FIG. 12, (a) is a diagram showing a spectrum of an OFDM transmission signal of the 802.11a, and (b) is a diagram showing a spectrum of an OFDM transmission signal of the 802.11ah.

As stated above, since the PLL unit 6 performs the re-pull-in operation using the new value K' of the fractional part of the frequency division ratio calculated in the step ST1005 in the frequency divider 104, the receiver Rx corrects the carrier frequency error Δfs that damages the subcarriers due to the notch characteristics shown in FIG. 12(*b*).

Thus, even when the OFDM transmission signals are transmitted using a frequency band of, for example, a sub-GHz band as in the 802.11ah, the receiver Rx can improve deterioration in reception performance that arises from the carrier frequency error exceeding the subcarrier interval, and avoid the damage of the subcarriers.

When the known sequence signal in the long preamble (LTF) is detected (ST1008, YES), in, for example, the reception periods of the long preamble (LTF) including the guard interval 3a shown in FIG. 2(*a*), the correlation calculating unit 201 calculates a correlation operation value between the OFDM reception signals having no delay and the OFDM reception signals having a delay corresponding to one cycle of the cycle L by performing complex multiplication on the OFDM reception signals converted into the digital signals in the ADCs 11 and 12 and the OFDM reception signals obtained by use of complex conjugation in which one cycle of the cycle L (=time ΔT1) of the OFDM reception signal is delayed. The correlation calculating unit 201 calculates a detected value of a phase error Δθ1 occurring in a period of the time ΔT1 based on a phase component of the correlation operation value.

The correlation calculating unit 201 averages detected values of phase errors Δθ1 in two symbols having little influence of a multi-path by the same complex multiplication for each cycle L during the reception periods of the long preamble (LTF) (ST1009). Thus, the correlation calculating unit 201 can suppress noise in the reception periods of the long preamble (LTF), and can improve reception SNR. The correlation calculating unit 201 outputs an average value Δθ1ave of the detected values of the phase errors Δθ1 calculated during the reception periods of the long preamble (LTF) to the frequency error estimating unit 202.

The frequency error estimating unit 202 calculates the carrier frequency error Δf1 according to Expression (5) by using the time ΔT1 and the average value Δθ1ave of the detected values of the phase errors Δθ1 calculated in the correlation calculating unit 201, and outputs the calculated carrier frequency error to the frequency error correcting unit 203.

[Expression 5]

$$\Delta f1 = \frac{\Delta \theta 1 ave}{\Delta T1} \quad (5)$$

The frequency error correcting unit 203 generates the correction signal (see Expression (6)) by using the carrier frequency error Δf1 calculated in the frequency error estimating unit 202, and corrects the carrier frequency error in the OFDM reception signals converted to the digital signals in the ADCs 11 and 12 by using the generated correction signal. The frequency error estimating unit 202 does not output the carrier frequency error Δf1 calculated according to Expression (5) in the reception periods of the long preamble (LTF) to the control unit 13.

[Expression 6]

$$\exp(-j2\pi \cdot \Delta f1 \cdot t) \quad (6)$$

As mentioned above, in the present embodiment, the transmitter Tx generates the preamble data in which the dummy periods are added between the long preamble (LTF) and the short preamble (STF) of the transmission frame of the 802.11ah. The transmitter Tx transmits the OFDM transmission signals on which the OFDM signal generation is performed based on the transmission data and the generated preamble data through the transmission antenna 37.

When it is determined that the carrier frequency error Δfs in the OFDM reception signals calculated in the reception periods of the short preamble (STF) is greater than the predetermined value Δfsub, the receiver Rx changes the value K of the fractional part of the frequency division ratio of the frequency divider 104 of the PLL unit 6 to K' (see Expression (3)), and performs the re-pull-in operation in the PLL unit 6 in the dummy period 6a. The receiver Rx averages the detected values by adding the detected values of the phase errors included in the OFDM reception signals base on the baseband OFDM reception signals by use of the down-conversion using the local oscillation signal generated in the PLL unit 6 after the re-pull-in operation in the reception periods of the long preamble (LTF).

That is, in the dummy period 6a, the receiver Rx substitutes the value K of the fractional part of the frequency division ratio of the frequency divider 104 of the oscillation frequency ΔfLO (see Expression (2)) of the local oscillator 107 of the PLL unit 6 with the value K' represented by Expression (3). Thus, after the re-pull-in operation of the PLL unit 6 (that is, in the reception periods of the long preamble (LTF), the receiver Rx can perform correction by using the carrier frequency error Δfs calculated in the reception periods of the short preamble (STF) from the oscillation frequency ΔfLO before the re-pull-in operation of the PLL unit 6 (that is, in the reception periods of the short preamble (STF)) (see Expression (7)). fLO is an oscillation frequency of the local oscillator 107 after the re-pull-in operation of the PLL unit 6 (that is, in the reception periods of the long preamble (LTF)).

[Expression 7]

$$f'LO = \left(M + \frac{K'}{2^n}\right)\frac{fXtal}{R} \quad (7)$$
$$= \frac{fXtal}{R}M + \frac{fXtal}{R \cdot 2^n}\left(K - \frac{R\Delta fs}{fXtal} \times 2^n\right)$$
$$= \frac{fXtal}{R}M + \frac{fXtal}{R \cdot 2^n}K - \Delta fs$$
$$= \left(M + \frac{K}{2^n}\right)\frac{fXtal}{R} - \Delta fs$$
$$= fLO - \Delta fs$$

After the re-pull-in operation of the PLL unit 6 (that is, in the reception periods of the long preamble (LTF)), since the down-conversion is performed on the radio-frequency OFDM reception signals by using the oscillation signal from the PLL unit 6 on which the correction is performed using the carrier frequency error Δfs, the receiver Rx can suppress the carrier frequency error in the baseband OFDM reception signals, and improve reception SNR.

Accordingly, even when the OFDM transmission signals are transmitted in, a frequency band of, for example, a sub-GHz band (for example, 900 MHz) as in the 802.11ah, the transmitter Tx and the receiver Rx of the present embodiment can improve deterioration in reception performance that arises from the carrier frequency error exceeding the subcarrier interval.

Second Embodiment

Next, a transmitter Tx and a receiver Rx of a second embodiment will be described with reference to FIG. 2(b) and FIG. 8. FIG. 2(b) is a schematic diagram showing an example of the configuration of a transmission frame of OFDM transmission signals in the second embodiment.

In the present embodiment, the configurations of the transmitter Tx and the receiver Rx are the same as the transmitter Tx and the receiver Rx of the first embodiment, and thus, the description thereof will be omitted. The operations of the transmitter Tx and the receiver Rx of the present embodiment different from the operations of the transmitter Tx and the receiver Rx of the first embodiment will be described.

In the present embodiment, the transmission frame of the 802.11ah shown in FIG. 2(b) is used. The transmission frame of the 802.11ah shown in FIG. 2(b) includes a preamble section including a short preamble (STF) and a long preamble (LTF), a header section (SIG), and a data section (DATA). The short preamble (STF) of the present embodiment is the same as the short preamble (STF) of the first embodiment.

In the present embodiment, the long preamble (LTF) includes a guard interval 3b, dummy periods 6b and 7b in which a known sequence signal is repeatedly allocated twice at a cycle L (32 μsec), and periods 4b and 5b in which a known sequence symbol is repeatedly allocated twice at a cycle L (32 μsec).

Next, the respective operations of the AFC unit 14, the control unit 13 and the PLL unit 6 within the receiver Rx of the present embodiment in the preamble section will be described with reference to FIG. 8. FIG. 8 is a flowchart for describing the respective operations of the AFC unit 14, the control unit 13 and the PLL unit 6 within the receiver Rx of the second embodiment in the preamble section. In the flowchart of FIG. 8, the same operations as those in the flowchart of FIG. 7 will be assigned the same step numbers, and thus, the description thereof will be omitted. Different contents will be described.

Figure 8:
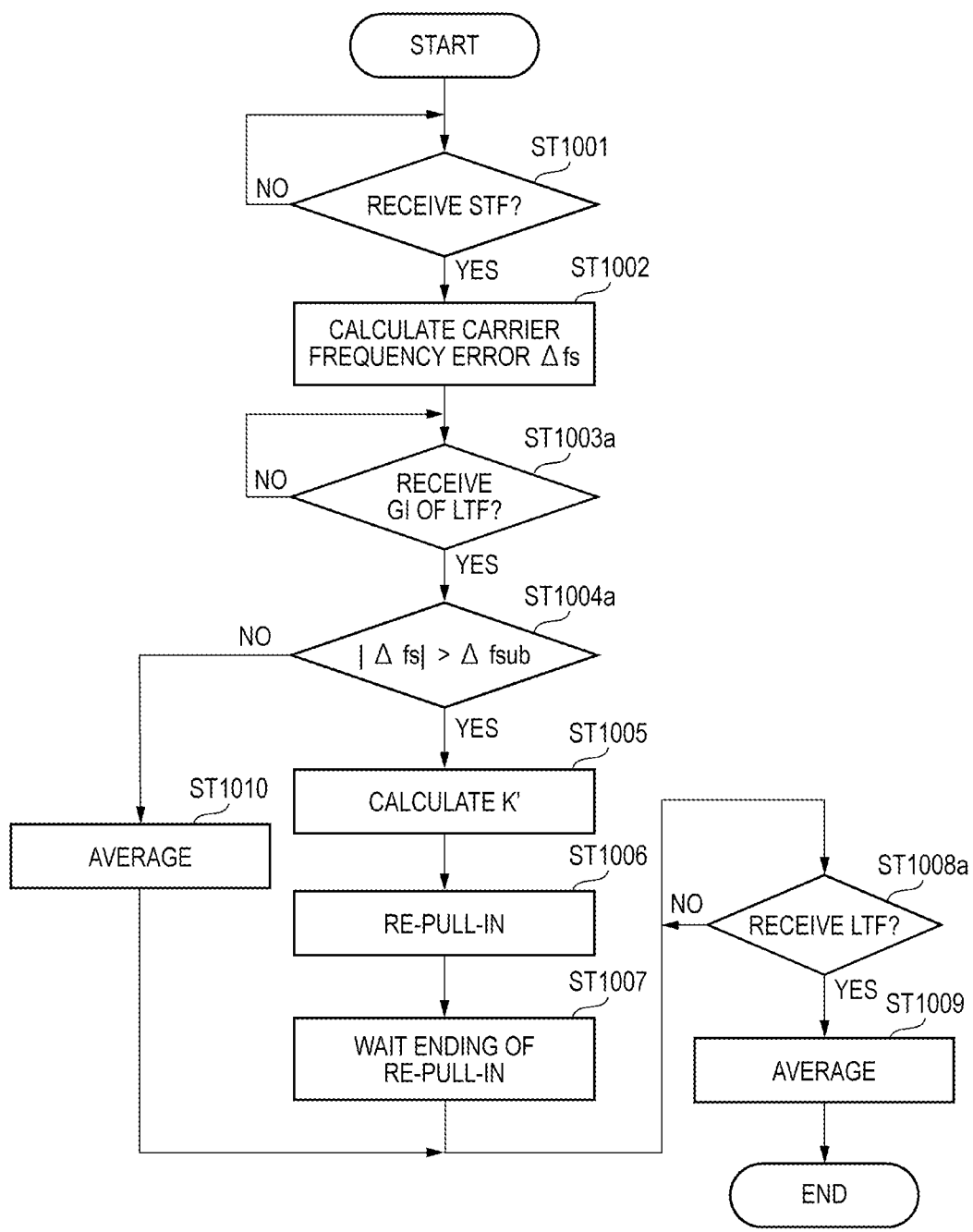
FIG. 8 is a flowchart for describing the respective operations of an AFC unit, a control unit and a PLL unit within the receiver according to the second embodiment in the preamble section.

In FIG. 8, after step ST1002, when the known sequence signal in the guard interval (GI) 3b of the long preamble (LTF) is detected (ST1003a, YES), the control unit 13 determines whether or not the absolute value (|Δfs|) of the carrier frequency error Δfs calculated in the frequency error estimating unit 202 is greater than the predetermined value Δfsub (ST1004a).

When it is determined that the absolute value (|Δfs|) of the carrier frequency error Δfs is less than the predetermined value Δfsub (ST1004a, NO), the control unit 13 causes the correlation calculating unit 201 to average the detected values of the phase errors and perform correlation operation on the OFDM reception signals converted into the digital signals in the ADCs 11 and 12 in the dummy periods 6b and 7b and the guard interval (GI) 3b of the long preamble (LTF).

That is, the correlation calculating unit 201 calculates a correlation operation value between the OFDM reception signals having no delay and the OFDM reception signals having a delay corresponding to one cycle of the cycle L by performing complex multiplication on the OFDM reception signals converted into the digital signals in the ADCs 11 and 12 and the OFDM reception signals obtained by use of complex conjugation in which one cycle of the cycle L (=time ΔT1) of the OFDM reception signal is delayed. The correlation calculating unit 201 calculates the detected value of the phase error Δθ1 occurring in the period of the time ΔT1 based on the phase component of the correlation operation value.

The correlation calculating unit 201 averages the detected values of the phase errors Δθ1 in two symbols having little influence of a multi-path by the same complex multiplication for each cycle L during the reception periods of the guard interval (GI) 3b and the dummy periods 6b and 7b of the long preamble (LTF) (ST1010). Thus, the correlation calculating unit 201 can suppress noise in the guard interval (GI) 3b and the dummy periods 6b and 7b of the long preamble (LTF), and improve reception SNR. The correlation calculating unit 201 outputs the average value Δθ1ave of the detected values of the phase errors Δθ1 calculated during the reception periods of the guard interval (GI) 3b and the dummy periods 6b and 7b of the long preamble (LTF) to the frequency error estimating unit 202.

After step ST1010, when the reception periods of the long preamble (LTF) subsequent to the dummy periods 6b and 7b are not started (ST1008a, NO), the receiver waits for the reception of the periods 4b and 5b of the long preamble (LTF). When the reception periods of the long preamble (LTF) subsequent to the dummy periods 6b and 7b are started (ST1008a, YES), since the operation is the same as the operation (ST1009) in the flowchart shown in FIG. 7, the description thereof will be omitted.

As described above, in the present embodiment, the transmitter Tx generates preamble data in which the dummy periods 6b and 7b in which the known sequence signal of the cycle L is repeated twice are added in the long preamble (LTF) after the short preamble (STF) of the transmission frame of the 802.11ah (see FIG. 2(b)). The transmitter Tx transmits the OFDM transmission signals on which the OFDM signal generation is performed based on the transmission data and the generated preamble data through the transmission antenna 37.

As compared to the operation of the first embodiment, when the carrier frequency error Δfs in the OFDM reception signals calculated in, for example, the second-half reception periods of the short preamble (STF) is less than the predetermined value Δfsub, the receiver Rx continuously adds a total of four long preambles (LTF), and averages the added values in the guard interval 3b and the dummy periods 6b and 7b corresponding to two cycles L in addition to the existing periods 4b and 5b.

Thus, in the present embodiment, in addition to the effects of the first embodiment, when it is not necessary to correct the carrier frequency error, the receiver Rx can further suppress noise in the long preamble (LTF), and further improve reception SNR. The dummy periods 6b and 7b are previously determined in consideration of the time taken to end the re-pull-in operation of the PLL unit 6 in the present embodiment. For example, since it is considered that a noise environment of a propagation path is not favorable in long-distance transmission as in the 802.11ah, when the dummy periods 6b and 7b are added to the long preamble (LTF) as in the present embodiment, the accuracy of transmission channel estimation is improved, and thus, it is possible to improve reception performance.

Third Embodiment

Figure 9:
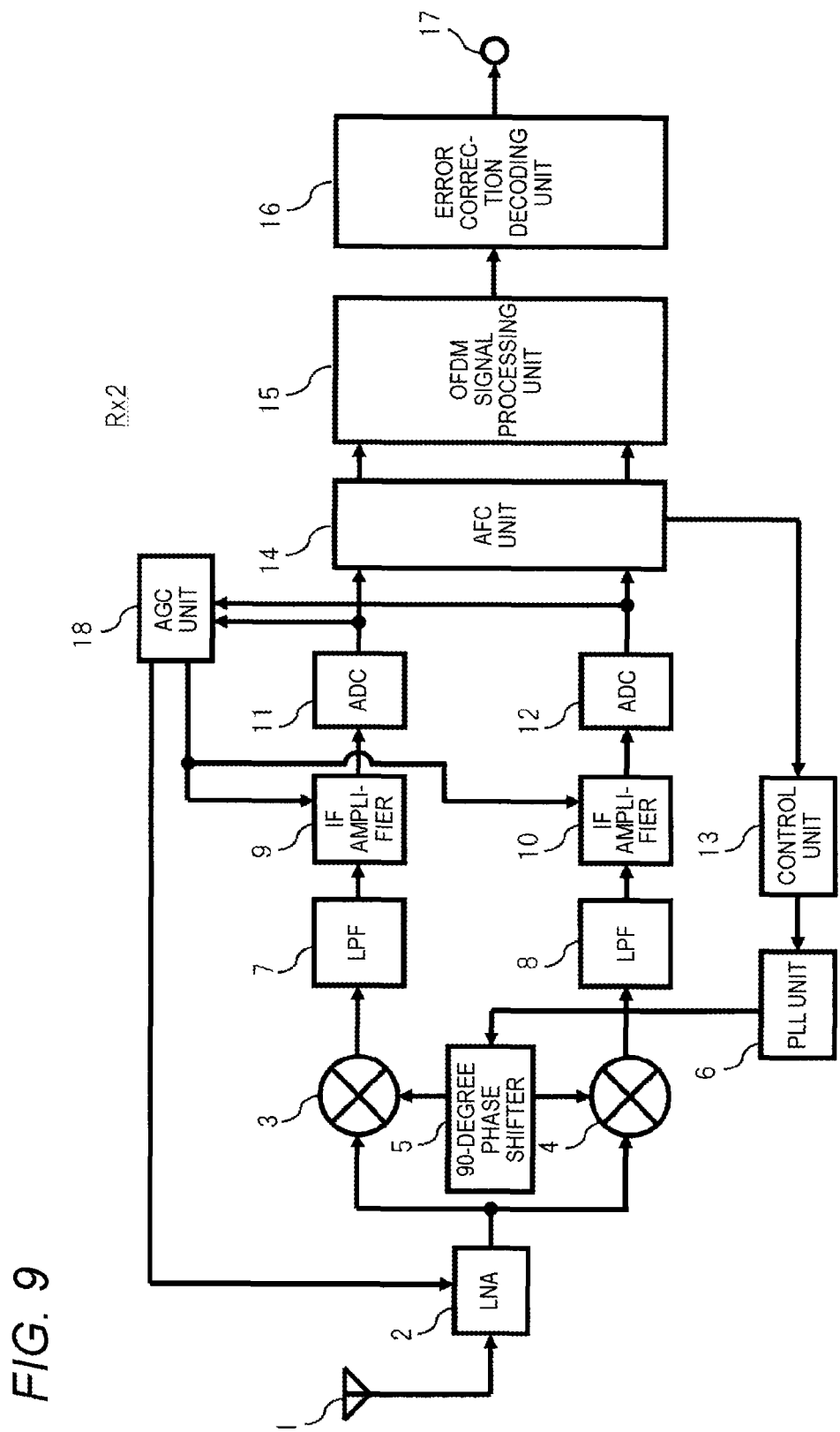
FIG. 9 is a block diagram showing an internal configuration example of the receiver according to the third and fourth embodiments.

Next, a transmitter Tx and a receiver Rx2 of a third embodiment will be described with reference to FIG. 2(c) and FIGS. 9 and 10. FIG. 2(c) is a schematic diagram showing an example of the configuration of a transmission frame of OFDM transmission signals in the third embodiment. FIG. 9 is a block diagram showing an internal configuration example of the receiver Rx2 of the third embodiment.

In the present embodiment, the configuration of the transmitter Tx is the same as the configuration of the transmitter Tx of the first embodiment, and thus, the description thereof will be omitted. The operations of the transmitter Tx and the receiver Rx2 and the configuration of the receiver Rx2 of the present embodiment different from the operations of the transmitter Tx and the receiver Rx and the configuration of the receiver Rx of the first embodiment will be described.

In the present embodiment, the transmission frame of the 802.11ah shown in FIG. 2(c) is used. The transmission frame of the 802.11ah shown in FIG. 2(c) includes a preamble section including a short preamble (STF) and a long preamble (LTF), a header section (SIG), and a data section (DATA). The long preamble (LTF) of the present embodiment is the same as the long preamble (LTF) of the first embodiment.

In the present embodiment, the short preamble (STF) includes periods (see symbols 1c to 2c) in which a known sequence symbol of a cycle S (8 μsec) is repeatedly allocated ten times, and dummy periods (see symbols 6c to 7c) in which a known sequence signal of a cycle S (8 μsec) is repeatedly allocated, for example, eight times.

Next, the configuration and operation of the receiver Rx2 of the present embodiment will be described with reference to FIG. 9. The receiver Rx2 shown in FIG. 9 includes a reception antenna 1, a LNA 2, mixers 3 and 4, a 90-degree phase shifter 5, a PLL unit 6, LPFs 7 and 8, IF amplifiers 9 and 10, ADCs 11 and 12, a control unit 13, an AFC unit 14, an OFDM reception processing unit 15, an error correction decoding unit 16, an AGC unit 18, and a reception data output terminal 17.

In, for example, some periods of the dummy periods or the first-half periods of the reception periods (see symbols 1c to 2c) of the short preamble (STF), the AGC unit 18 detects an error between signal levels of the OFDM reception signals converted into the digital signals in the ADCs 11 and 12 and a predetermined target signal level. Based on the error between the signal levels of the OFDM reception signals converted into the digital signals in the ADCs 11 and 12 and the predetermined target signal level, the AGC unit 18 determines the gain of the LNA 2 and the IF amplifiers 9 and 10 such that the signal levels of the OFDM reception signals converted into the digital signals in the ADCs 11 and 12 are converged on the target signal level.

The LNA 2 and the IF amplifiers 9 and 10 amplify the signal levels of the input OFDM reception signals by using the gain determined by the AGC unit 18.

Next, the respective operations of the AFC unit 14, the control unit 13 and the PLL unit 6 within the receiver Rx2 of the present embodiment in the preamble section will be described with reference to FIG. 10. FIG. 10 is a flowchart for describing the respective operations of the AFC unit 14, the control unit 13 and the PLL unit 6 within the receiver Rx2 of the third embodiment in the preamble section. In the flowchart of FIG. 10, the same operations as those in the flowchart shown in FIG. 7 or FIG. 8 will be assigned the same step numbers, and the description thereof will be omitted. Different contents will be described.

Figure 10:
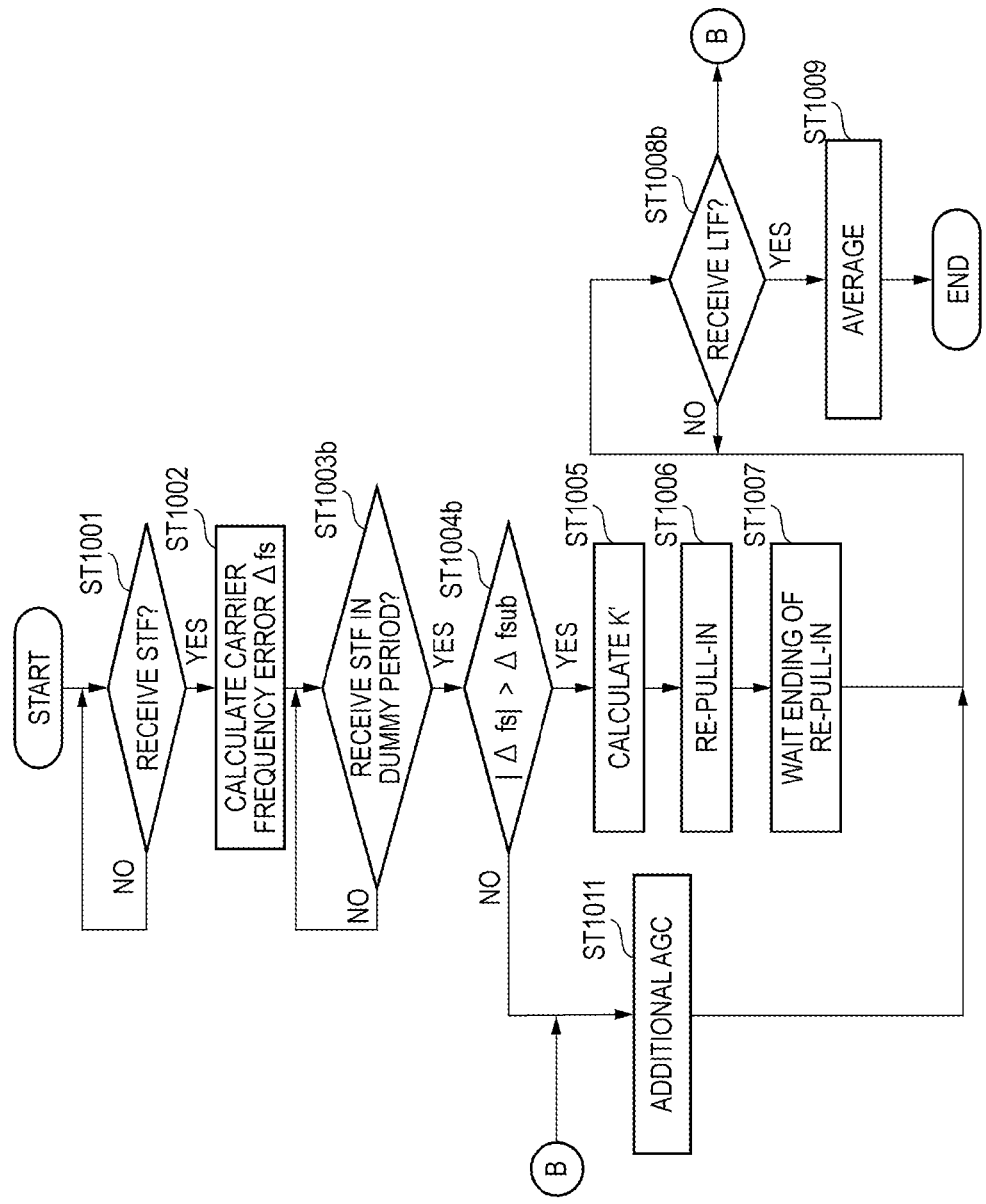
FIG. 10 is a flowchart for describing the respective operations of an AFC unit, a control unit and a PLL unit within the receiver according to the third embodiment in the preamble section.

Although not shown in FIG. 10, when the known sequence signal in the short preamble (STF) is detected (ST1001, YES), the AGC unit 18 detects the error between the signal levels of the OFDM reception signals converted into the digital signals in the ADCs 11 and 12 and the predetermined target signal level in, for example, first-half periods of the reception periods (see symbols 1c to 2c) of the short preamble (STF) shown in, for example, FIG. 2(c).

Based on the error between the signal levels of the OFDM reception signals converted into the digital signals in the ACDs 11 and 12 and the predetermined target signal level, the AGC unit 18 determines the gain of the LNA 2 and the IF amplifiers 9 and 10 such that the signal levels of the OFDM reception signals converted into the digital signals in the ADCs 11 and 12 are converged on the target signal level.

The LNA 2 and the IF amplifiers 9 and 10 amplify the signal levels of the input OFDM reception signals by using the gain determined by the AGC unit 18. When the AGC of the OFDM reception signals converted into the digital signals in the ADCs 11 and 12 ends, the operation of step ST1002 is performed.

After step ST1002, when the known sequence signal in the first dummy period 6c is detected (ST1003b, YES), the control unit 13 determines whether or not the absolute value (|Δfs|) of the carrier frequency error Δfs calculated in the frequency error estimating unit 202 is greater than the predetermined value Δfsub (ST1004b).

When it is determined that the absolute value (|Δfs|) of the carrier frequency error Δfs is less than the predetermined value Δfsub (ST1004b, NO), the control unit 13 outputs a control signal for performing the AGC on the OFDM reception signals converted into the digital signals in the ADCs 11 and 12 again to the AGC unit 18 in the dummy periods (see symbols 6c to 7c). In order to simplify FIG. 9, an arrow between the control unit 13 and the AGC unit 18 is not illustrated.

That is, the AGC unit 18 detects the error between the signal levels of the OFDM reception signals converted into the digital signals in the ADCs 11 and 12 and the predetermined target signal level in the dummy periods (see symbols 6c to 7c) in addition to, for example, the first-half periods of the reception periods (see symbols 1c to 2c) of the short preamble (STF).

Based on the error between the signal levels of the OFDM reception signals converted into the digital signals in the ADCs 11 and 12 and the predetermined target signal level, the AGC unit 18 determines the gain of the LNA 2 and the IF amplifiers 9 and 10 such that the signal levels of the OFDM reception signals converted into the digital signals in the ADCs 11 and 12 are converged on the target signal level (ST1011).

The LNA 2 and the IF amplifiers 9 and 10 amplify the signal levels of the input OFDM reception signals by using the gain determined by the AGC unit 18.

After step ST1011, when the reception periods of the long preamble (LTF) are not started (ST1008b, NO), the AGC of the OFDM reception signals converted into the digital signals in the ADCs 11 and 12 is continued in the dummy periods (see symbols 6c to 7c) (ST1011). When the reception periods of the long preamble (LTF) are started (ST1008b, YES), the operation is the same as the operation (ST1009) of the flowchart shown in FIG. 7, and the description thereof will be omitted.

As mentioned above, in the present embodiment, the transmitter Tx generates preamble data in which the dummy periods (see symbols 6c to 7c) in which the known sequence signal of the cycle S is repeated by, for example, eight times are added in the short preamble (STF) of the transmission frame of the 802.11ah (see FIG. 2(c)). The transmitter Tx transmits the OFDM transmission signal on which the OFDM signal generation is performed based on the transmission data and the generated preamble data through the transmission antenna 37.

As compared to the operation of the first embodiment, when the absolute value (|Δfs|) of the carrier frequency error Δfs in the OFDM reception signals calculated in, for example, the second-half reception periods of the short preamble (see symbols 1c to 2c) is less than the predetermined value Δfsub, additional AGC of the OFDM reception signals is performed in the dummy periods (see symbols 6c to 7c) corresponding to, for example, eight cycles S.

Thus, in the present embodiment, in addition to the effects of the first embodiment, the receiver Rx2 can control the signal levels of the OFDM reception signals to be converged on the predetermined target signal level with high accuracy.

Fourth Embodiment

Figure 11:
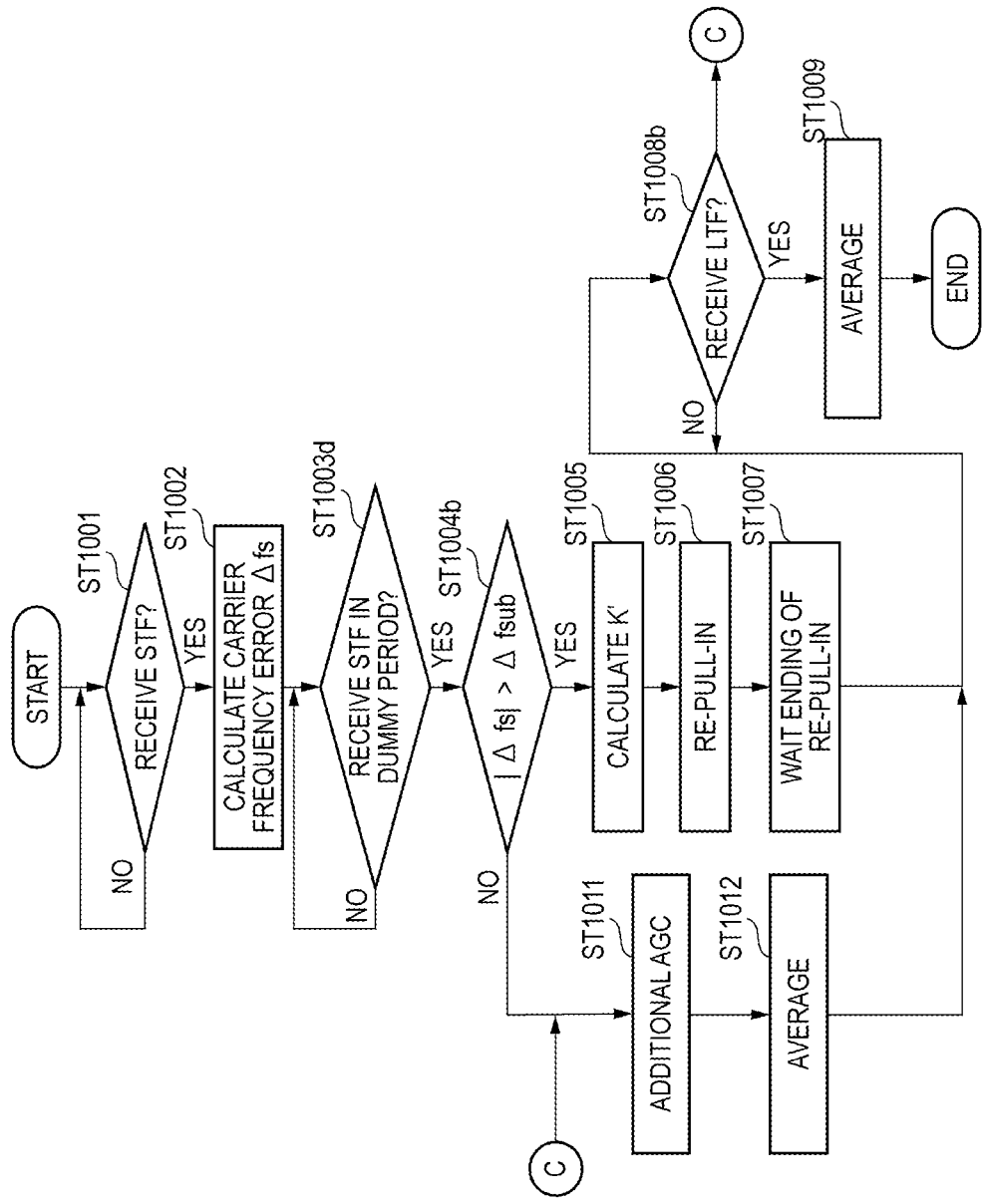
FIG. 11 is a flowchart for describing the respective operations of an AFC unit, a control unit and a PLL unit within the receiver according to the fourth embodiment in the preamble section.

Next, a transmitter Tx and a receiver Rx2 of a fourth embodiment will be described with reference to FIG. 2(d) and FIGS. 9 and 11. FIG. 2(d) is a schematic diagram showing an example of the configuration of a transmission frame of OFDM transmission signals in the fourth embodiment.

In the present embodiment, the configuration of the transmitter Tx is the same as that of the transmitter Tx of the first embodiment, and the configuration of the receiver Rx2 is the same as that of the receiver Rx of the third embodiment. Thus, the description thereof will be omitted. The operations of the transmitter Tx and the receiver Rx2 of the present embodiment different from those of the transmitter Tx and the receiver Rx of the first or third embodiment will be described.

In the present embodiment, the transmission frame of the 802.11ah shown in FIG. 2(d) is used. The transmission frame of the 802.11ah shown in FIG. 2(d) includes a preamble section including a short preamble (STF) and a long preamble (LTF), a header section (SIG), and a data section (DATA).

In the present embodiment, the short preamble (STF) includes periods (see symbols 1d to 2d) in which a known sequence symbol of a cycle S (8 μsec) is repeatedly allocated ten times, and dummy periods (see symbols 6d to 7d) in which a known sequence signal of a cycle S (8 μsec) is repeatedly allocated, for example, four times.

In the present embodiment, the long preamble (LTF) includes a guard interval 3d, a dummy period 8d in which a single known sequence signal of a cycle L (32 μsec) is allocated, and periods 4d and 5d in which a known sequence symbol of a cycle L (32 μsec) is repeatedly allocated twice.

Next, the respective operations of the AFC unit 14, the control unit 13 and the PLL unit 6 within the receiver Rx2 of the present embodiment in the preamble section will be described with reference to FIG. 11. FIG. 11 is a flowchart for describing the respective operations of the AFC unit 14, the control unit 13 and the PLL unit 6 within the receiver Rx2 of the fourth embodiment in the preamble section. In the flowchart shown in FIG. 14, the same operations as those in the flowchart shown in FIG. 7, 8 or 10 will be assigned to the same step numbers, and the description thereof will be omitted. Different contents will be described.

After step ST1002, when the known sequence signal in the first dummy period 6d is detected (ST1003d, YES), the control unit 13 determines whether or not the absolute value (|Δfs|) of the carrier frequency error Δfs calculated in the frequency error estimating unit 202 is greater than the predetermined value Δfsub (ST1004b).

When it is determined that the absolute value (|Δfs|) of the carrier frequency error Δfs is less than the predetermined value Δfsub (ST1004b, NO), the control unit 13 outputs a control signal for performing the AGC on the OFDM reception signals converted into the digital signals in the ADCs 11 and 12 again to the AGC unit 18 in the dummy periods (see symbols 6d to 7d) of the short preamble (STF).

That is, the AGC unit 18 detects the error between the signal levels of the OFDM reception signals converted into the digital signals in the ADCs 11 and 12 and the predetermined target signal level in, for example, the dummy periods (see symbols 6d to 7d) in addition to, for example, the first-half periods of the reception periods (see symbols 1d to 2d) of the short preamble (STF).

Based on the error between the signal levels of the OFDM reception signals converted into the digital signals in the ADCs 11 and 12 and the predetermined target signal level, the AGC unit 18 determines the gain of the LNA 2 and the IF amplifiers 9 and 10 such that the signal levels of the OFDM reception signals converted into the digital signals in the ADCs 11 and 12 are converged on the target signal level (ST1011).

The LNA 2 and the IF amplifiers 9 and 10 amplify the signal levels of the input OFDM reception signals by using the gain determined by the AGC unit 18.

After step ST1011, the control unit 13 causes the correlation calculating unit 201 to perform the correlation operation of the OFDM reception signals converted into the digital signals in the ADCs 11 and 12 and to average the detected values of the phase errors in the guard interval 3d and an additional long preamble (LTF) 8d inserted as the dummy period.

That is, the correlation calculating unit 201 calculates a correlation operation value between the OFDM reception signals having no delay and the OFDM reception signals having a delay corresponding to one cycle of the cycle L by performing the complex multiplication on the OFDM reception signals converted into the digital signals in the ADCs 11 and 12 and the OFDM reception signals obtained by use of complex conjugation in which one cycle of the cycle L (=time ΔT1) of the OFDM reception signal is delayed (ST1012). The correlation calculating unit 201 calculates an average value of the detected values of the phase errors Δθ1 occurring in a period of the time ΔT1 based on the phase component of the correlation operation value.

After step ST1012, when the reception periods of the long preamble (LTF) are not started (ST1008b, NO), the AGC of the OFDM reception signals in the dummy periods (see symbols 6d to 7d) or the correlation operation of the OFDM reception signals in the guard interval 3d and the dummy period 8d is continued (ST1011, ST1012). When the reception periods of the long preamble (LTF) are started (ST1008b, YES), since the operation is the same as the operation (ST1009) of the flowchart shown in FIG. 8, the description thereof will be omitted.

As stated above, in the present embodiment, the transmitter Tx generates preamble data in which the dummy periods (see symbols 6d to 7d) in which the known sequence signal of the cycle S is repeated by, for example, four times is added in the short preamble (STF) of the transmission frame of the 802.11ah and the dummy period 8d in which the known sequence signal of the cycle L is repeated by one is added in the long preamble (LTF). The transmitter Tx transmits the OFDM transmission signals on which the OFDM signal generation is performed based on the transmission data and the generated preamble data through the transmission antenna 37.

As compared to the operation of the first embodiment, when the carrier frequency error Δfs in the OFDM reception signals calculated in, for example, the second-half reception periods of the short preamble (see symbols 1d to 2d) is less than the predetermined value Δfsub, the receiver Rx2 performs additional AGC of the OFDM reception signals in the dummy periods (see symbols 6d to 7d) corresponding to, for example, four cycles S.

The receiver Rx2 performs the correlation operation on the OFDM reception signals in the dummy period 8d corresponding to one cycle L allocated subsequently to the guard interval 3d of the long preamble (LTF).

Thus, in addition to the effects of the first embodiment, in the present embodiment, the receiver Rx2 can control the signal levels of the OFDM reception signals to be converged on the predetermined target signal level in the dummy periods (see symbols 6d to 7d) corresponding to, for example, four cycles S with high accuracy. In addition to the effects of the first embodiment, the receiver Rx2 can further suppress noise components in the long preamble (LTF) and further improve reception SNR by adding the dummy period 8d which is allocated subsequently to the guard interval 3d of the long preamble (LTF) and averaging the values obtained in the periods so as to correspond to one cycle L to the periods 4d and 5d of the existing long preamble (LTF).

Although various embodiments have been described with reference to the drawings, the present disclosure is not limited to the examples described in the present disclosure. It should be understood to those skilled in the art that various changed examples or modified examples can be conceived within the scope described in the claims, and such changed examples or modified examples are included in the technical scope of the present disclosure.

In the first and second embodiments, it has been described that at the time when the reception of the short preamble (STF) is finished, the frequency error correcting unit 203 outputs the OFDM reception signals converted into the digital signals in the ADCs 11 and 12 to the OFDM reception processing unit 15 without performing the operation on the OFDM reception signals. However, in the first and second embodiments, the frequency error correcting unit 203 may output the OFDM reception signals converted into the digital signals in the ADCs 11 and 12 to the OFDM reception processing unit 15 without performing the operation on the OFDM reception signals when the fractional part K of the frequency division ratio of the frequency divider 104 of the PLL unit 6 is changed, and the frequency error correcting unit 203 may correct the carrier frequency error Ms when the K is not changed.

In the second to fourth embodiments, the number of short preambles and the number of long preambles which are allocated as the dummy periods are only an example, and the number of short preambles, the number of long preambles or the number of combinations of the short preambles and long preambles which are added as the dummy periods may be freely set as long as the re-pull-in of the PLL unit 6 ends within the dummy period.

In the third and fourth embodiments, it has been described that the additional AGC control is performed in the short preambles (STF) as the dummy periods, but the carrier frequency error may also be detected in the exiting short preambles (STF) (1c to 2c or 1d to 2d) in addition to the dummy periods.

In the first to fourth embodiments, although it has been described that the preamble of the IEEE 802.11 is used, a preamble of any wireless LAN standard may be used as long as the preamble section includes the short preamble and the long preamble and the communication device that corrects the carrier frequency error in the reception period of the short preamble.

The respective components of the transmitter Tx and the receivers Rx and Rx2 in the first to fourth embodiments may be realized by large scale integration (LSI) which is an integrated circuit. The components of the respective units of the transmitter Tx and the receivers Rx and Rx2 may be individually implemented as a single chip, or may be implemented as a single chip including some or all of the components. The integrated circuit is not limited to LSI, and the LSI may be called an integrated circuit (IC), system LSI, super LSI, or ultra LSI depending on a degree of integration.

The integrated circuit is not limited to the LSI, and may be realized by a dedicated circuit or a general purpose processor. For example, a field-programmable gate array (FPGA), or a reconfigurable processor that can perform reconfiguration of the connecting and setting of circuit cells within the LSI may be used. If an integrated circuit technology that can be replaced with the LSI due to the progress of a semiconductor technology or another derived technology is developed, the integration of functional blocks may be performed by using this technology. The integration of functional blocks may be performed using a biotechnology.

At least a part of the procedure of the operations of the receivers Rx and Rx2 in the first to fourth embodiments may be defined as a program, and, for example, a central processing unit (CPU) may read a program stored in a memory and execute the read program, or may store a program in a recording medium and may distribute the program.

The present disclosure may be represented as the transmission method and the reception method that perform the respective operations of the transmitter Tx and the receivers Rx and Rx2 of the first embodiment.

The first to fourth embodiments may realize combinations of all transmitters, transmission methods, transmission circuits, receivers, reception methods, reception circuits and programs that perform a part of a transmission process or a reception process that realize the first to fourth embodiments. For example, the receiver or the integrated circuit (reception circuit) may realize a part of the configuration of the receiver described in the first to fourth embodiments, a procedure of other operations may be defined as a program, and a CPU may read a program stored in a memory and execute the read program.

This application is based on Japanese Patent application No. 2012-239514 filed on Oct. 30, 2012, the contents of which are incorporated herein by reference.

INDUSTRIAL APPLICABILITY

The present disclosure is useful as a transmitter, a receiver, a transmission method and a reception method that improve deterioration in reception performance which arises from a carrier frequency error exceeding a subcarrier interval even when OFDM transmission signals are transmitted using a frequency band of, for example, a sub-GHz band.

REFERENCE SIGNS LIST

1: Reception antenna
2: LNA
3, 4: Mixer
5: 90-degree phase shifter
6: PLL unit
7, 8: LPF
9, 10: IF amplifier
11, 12: ADC
13: Control unit
14: AFC unit
15: OFDM reception processing unit
16: Error correction decoding unit
31: Error correction encoding unit
32: Preamble data generating unit
33: Transmission data composing unit
34: OFDM signal generating unit
35: Frequency converting unit
36: Local oscillation signal generating unit
37: Transmission antenna
Rx: Receiver
Tx: Transmitter

The invention claimed is:

1. A transmitter comprising:
preamble generation circuitry which, in operation, generates first and second synchronization preambles having different numbers of subcarriers, and adds a predetermined dummy period between the first synchronization preamble and the second synchronization preamble;
transmission signal generation circuitry which, in operation, generates an Orthogonal Frequency Division Multiplexing (OFDM) transmission signal by using the generated first and second synchronization preambles; and
transmission circuitry which, in operation, converts the generated OFDM transmission signal into a radio-frequency OFDM signal and transmits the radio-frequency OFDM signal,
wherein the preamble generating circuitry, in operation, allocates M number of symbols of the first synchronization preamble and N number of symbols of the second synchronization preamble in the predetermined dummy period, where M is an integer of 1 or more and where N is an integer of 1 or more.

2. A receiver comprising:
reception circuitry which, in operation, receives a radio-frequency Orthogonal Frequency Division Multiplexing (OFDM) transmission signal which includes first and second synchronization preambles having different numbers of subcarriers and a predetermined dummy period between the first synchronization preamble and the second synchronization preamble, and converts the received radio-frequency OFDM transmission signal into a baseband OFDM reception signal;
Phase Locked Loop (PLL) circuitry which, in operation, outputs a radio-frequency local signal;
frequency error estimation circuitry which, in operation, detects a carrier frequency error in the baseband OFDM reception signal by using the first synchronization preamble; and
control circuitry which, in operation, changes an oscillation frequency in the PLL circuitry in the predetermined dummy period when the detected carrier frequency error is greater than a predetermined value,
wherein M number of symbols of the first synchronization preamble and N number of symbols of the second synchronization preamble are allocated in the predetermined dummy period in the OFDM transmission signal, where M is an integer of 1 or more and N is an integer of 1 or more.

3. A receiver comprising:
reception circuitry which, in operation, receives a radio-frequency Orthogonal Frequency Division Multiplexing (OFDM) transmission signal which includes first and second synchronization preambles having different numbers of subcarriers and a predetermined dummy period between the first synchronization preamble and the second synchronization preamble, and converts the received radio-frequency OFDM transmission signal into a baseband OFDM reception signal;
Phase Locked Loop (PLL) circuitry which, in operation, outputs a radio-frequency local signal;
frequency error estimation circuitry which, in operation, detects a carrier frequency error in the baseband OFDM reception signal by using the first synchronization preamble;
control circuitry which, in operation, changes an oscillation frequency in the PLL circuitry in the predetermined dummy period when the detected carrier frequency error is greater than a predetermined value; and
correlation calculation circuitry which, in operation, adds the second synchronization preamble having N number of symbols allocated in the dummy period and the second synchronization preamble allocated outside the dummy period and averages the added result when the detected carrier frequency error is not greater than the predetermined value.

* * * * *